(12) United States Patent
Giovannetti et al.

(10) Patent No.: US 8,998,581 B2
(45) Date of Patent: Apr. 7, 2015

(54) COMPOSITE SHROUD AND METHODS FOR ATTACHING THE SHROUD TO PLURAL BLADES

(75) Inventors: Iacopo Giovannetti, Florence (IT); Massimo Giannozzi, Florence (IT); Dino Bianchi, Florence (IT); Leonardo Tognarelli, Florence (IT); Manuele Bigi, Florence (IT); Andrea Massini, Florence (IT)

(73) Assignee: Nuovo Pignone S.p.A., Florence (IT)

(*) Notice: Subject to any disclaimer, the term of this patent is extended or adjusted under 35 U.S.C. 154(b) by 598 days.

(21) Appl. No.: 13/319,493

(22) PCT Filed: May 7, 2010

(86) PCT No.: PCT/EP2010/056289
§ 371 (c)(1),
(2), (4) Date: Dec. 16, 2011

(87) PCT Pub. No.: WO2010/128153
PCT Pub. Date: Nov. 11, 2010

(65) Prior Publication Data
US 2012/0141261 A1    Jun. 7, 2012

(30) Foreign Application Priority Data

May 8, 2009   (IT) .............................. MI2009A0781

(51) Int. Cl.
*F01D 5/22* (2006.01)
*B23P 15/04* (2006.01)
(Continued)

(52) U.S. Cl.
CPC .......... *F04D 29/023* (2013.01); *F04D 29/2227* (2013.01); *F04D 29/284* (2013.01)

(58) Field of Classification Search
CPC .. F04D 29/023; F04D 29/284; F04D 29/2227
USPC ............. 416/180, 182, 185, 188, 229 R, 230, 416/229 A, 241 A; 29/889.2, 889.23, 889.4, 29/889.71
See application file for complete search history.

(56) References Cited

U.S. PATENT DOCUMENTS

| 4,676,722 A | 6/1987 | Marchal et al. |
| 4,697,987 A | 10/1987 | Katayama et al. |

(Continued)

FOREIGN PATENT DOCUMENTS

| CN | 86101358 A | 12/1986 |
| DE | 8519005 U1 | 2/1986 |

(Continued)

OTHER PUBLICATIONS

Unofficial English translation of a JP Office Action dated Feb. 25, 2014 issued in connection with corresponding JP Application No. 2012-509058.

(Continued)

*Primary Examiner* — Igor Kershteyn
(74) *Attorney, Agent, or Firm* — GE Global Patent Operation; Joanna M. Dombrowski

(57) ABSTRACT

An impeller for a turbo-machine and is provided. The impeller includes a metallic base having a central hole, a back surface and a front surface opposite to the back surface; at least one blade extending on the front surface of the metallic base; a composite shroud attached to the at least one blade such that plural closed paths or vanes are formed by the front surface of the metallic base, the at least one blade and the composite shroud; and a connector configured to attach the composite shroud to the metallic base or the at least one blade.

55 Claims, 22 Drawing Sheets

(51) Int. Cl.
*F01D 1/02* (2006.01)
*F01D 5/14* (2006.01)
*F04D 29/02* (2006.01)
*F04D 29/22* (2006.01)
*F04D 29/28* (2006.01)

(56) References Cited

U.S. PATENT DOCUMENTS

| | | | |
|---|---|---|---|
| 5,538,395 A * | 7/1996 | Hager | 416/144 |
| 5,539,395 A | 7/1996 | Buss et al. | |
| 6,146,094 A * | 11/2000 | Obana et al. | 415/200 |
| 6,402,467 B1 * | 6/2002 | Godichon et al. | 415/200 |
| 6,592,329 B1 | 7/2003 | Hirose et al. | |
| 8,133,009 B2 | 3/2012 | Salvesen | |
| 2005/0100442 A1 | 5/2005 | Clement | |
| 2007/0098556 A1 * | 5/2007 | Sanagi et al. | 416/182 |
| 2009/0110556 A1 | 4/2009 | Jahnz et al. | |
| 2011/0194941 A1 | 8/2011 | Parkin et al. | |
| 2013/0004316 A1 | 1/2013 | Matwey et al. | |
| 2013/0017067 A1 | 1/2013 | Cantelli et al. | |

FOREIGN PATENT DOCUMENTS

| | | |
|---|---|---|
| DE | 4409629 A1 | 9/1994 |
| DE | 202005021324 U1 | 10/2007 |
| EP | 0206031 A1 | 12/1986 |
| EP | 0890745 A2 | 1/1999 |
| EP | 2325495 A2 | 5/2011 |
| JP | 56132499 A | 10/1981 |
| JP | S6329098 A | 2/1988 |
| JP | 141898 A | 6/1991 |
| JP | 03106195 A | 11/1991 |
| JP | H094598 A | 1/1997 |
| JP | H09126185 A | 5/1997 |
| JP | 9195987 A | 7/1997 |
| JP | H11324982 A | 11/1999 |
| JP | H11324983 A | 11/1999 |
| JP | 2001140789 A | 5/2001 |
| JP | 2009510305 A | 3/2009 |
| RU | 2113626 C1 | 6/1998 |
| RU | 2290285 C2 | 12/2006 |
| WO | 2007037699 A1 | 4/2007 |
| WO | 2009058336 A2 | 5/2009 |

OTHER PUBLICATIONS

Search Report and Written Opinion from corresponding Italian Application No. IT MI20090781, dated Nov. 18, 2009.
Unofficial English translation of CN Office Action dated Oct. 24, 2013 from corresponding Application No. 201080030778.7.
Office action issued in connection with RU Patent Application No. 2011144881/06(067301) dated Jul. 30, 2014.
Office action issued in connection with CN Patent Application No. 201080030778.7 dated Jul. 31, 2014.
Unofficial English translation of Italian Search Report issued in connection with related IT Application No. CO2013A000067 dated Sep. 17, 2014.

* cited by examiner

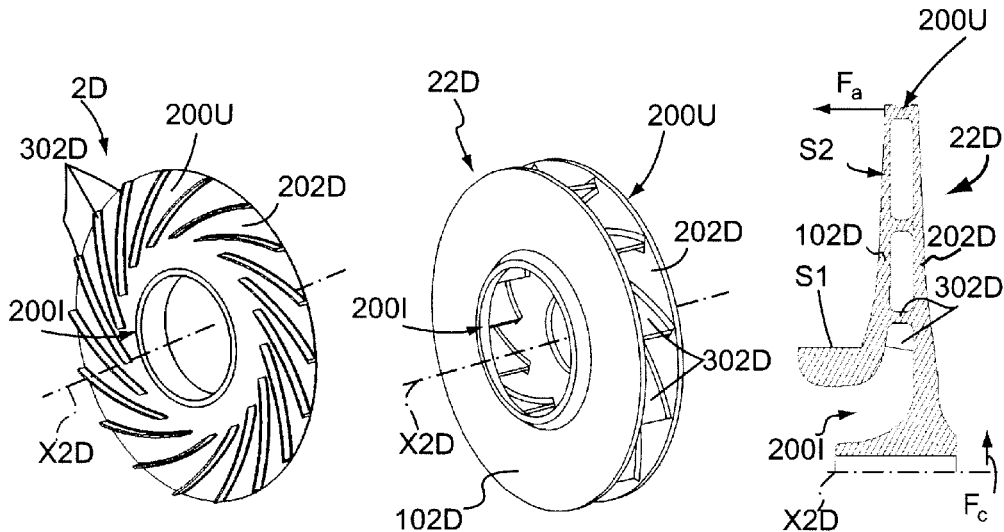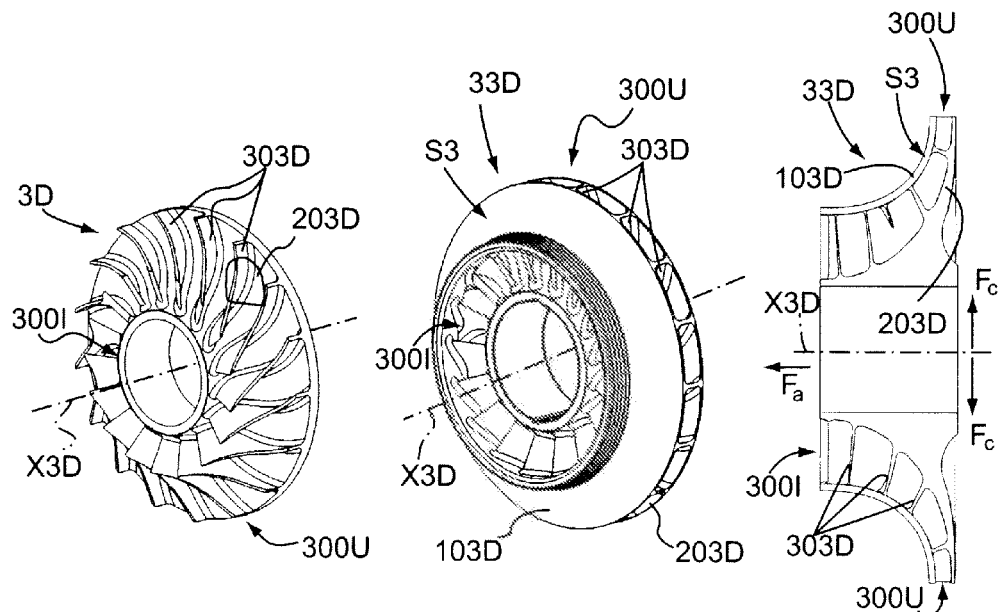

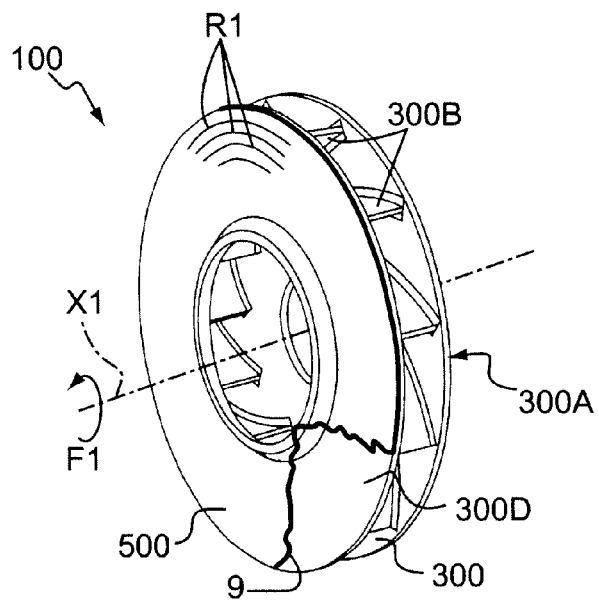
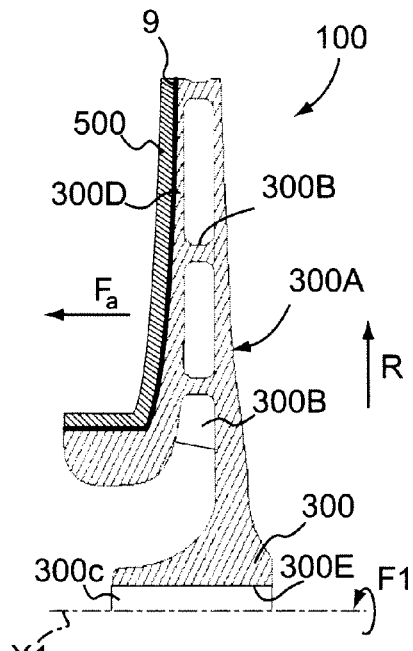
Fig.5A  Fig.5B
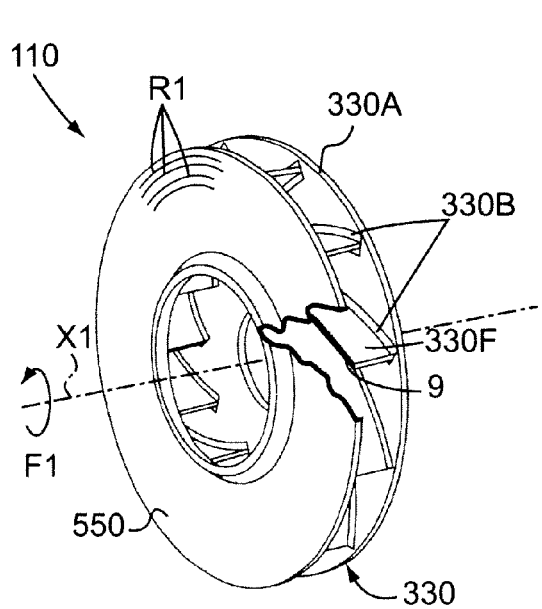
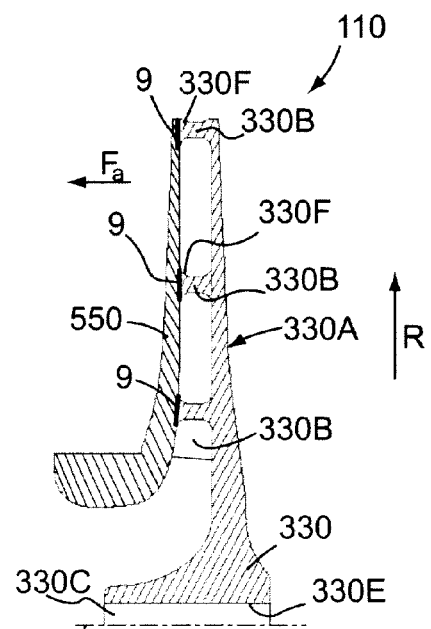
Fig.6A  Fig.6B

COMPOSITE SHROUD AND METHODS FOR ATTACHING THE SHROUD TO PLURAL BLADES

CROSS-REFERENCE TO RELATED APPLICATIONS

This is a national stage application filed under 35 U.S.C. §371(c) of prior-filed, co-pending PCT patent application serial number PCT/EP2010/056289, filed on May 7, 2010 which claims priority to Italian Patent Application Serial No. MI2009A000781, filed on May 8, 2009, the entire contents of which are incorporated herein by reference.

BACKGROUND OF THE INVENTION

1. Field of the Invention

Embodiments of the subject matter disclosed herein generally relate to methods and systems and, more particularly, to mechanisms and techniques for attaching a composite shroud to plural blades of an impeller.

2. Description of the Prior Art

Compressors are a particular type of turbo-machine that is able to increase a pressure of a compressible fluid (e.g., gas) by using mechanical energy. Various types of compressors are used in processing plants in the oil and gas industry. Among these compressors, there is the so-called centrifugal compressor in which energy is supplied to the gas particles by centrifugal acceleration. The centrifugal acceleration may be achieved by the rotation of a rotating member composed of one or more wheels or centrifugal rotors made of metal, and housed inside a stator.

A centrifugal compressor may be fitted with a single rotor (impeller), the single stage configuration, or with several rotors arranged in series, the multi-stage compressors. Each stage of a centrifugal compressor includes a suction duct in the stator for the gas to be received, a rotor which is able to supply the kinetic energy to the gas, and a ducting system within the stator, between one rotor and the following rotor for the purpose of converting the kinetic energy of the gas leaving the rotor into pressure.

Another type of turbo-machine is the pump, which is able to increase the pressure of a non-compressible fluid (e.g., liquid) by using mechanical energy. Various types of pumps used in the oil and gas industry include the so-called centrifugal pump, in which mechanical energy is supplied to the liquid in the form of centrifugal acceleration, by rotating a rotating member composed of one or more wheels or centrifugal rotors, and generally made of metal in the case of high performance turbo-machines. Centrifugal pumps may be fitted with a single rotor or a number of rotors arranged in series and housed within a stator. The centrifugal pumps may be formed with suitable expansion and return ducts in order to convert the kinetic energy of the liquid leaving the rotor into pressure.

Centrifugal rotors, whether for centrifugal compressors or centrifugal pumps, are generally classified as rotors with "single", "two-dimensional" or "three-dimensional" curvatures depending on their geometry. In particular, a 2D centrifugal rotor in two dimensions (see FIG. 1A) includes blades 302D possessing a profile that substantially extends in two dimensions around a rotational axis X2D of the rotor. In general, blades 302D have a profile that is radial from an inlet orifice 200I towards an outlet orifice 200U. In addition, the 2D rotor includes a backing disc 202D, which is radial with respect to the axis of rotation X2D and to which the blades 302D are attached.

FIG. 1B shows a two-dimensional rotor 22D similar to that shown in FIG. 1A, but which differs from the former in that it possesses a front disc or backing disc 102D, fixed onto the side of the blades 302D opposite to the backing disc 202D as discussed later in more details.

FIG. 1C shows an enlarged cross section of the rotor 22D, in which the backing disc 102D is shown fixed to blades 302D, and which presents a substantially radial development, suitable for forming throughput spaces for the fluid, and at the same time, guiding it from the inlet orifice 200I to the outlet orifice 200U. In particular, in the two-dimensional rotor 22D, the backing disc 102D has a "plate-like" shape with a surface S1 which is substantially parallel to the axis X2D, which is shaped in the vicinity of the inlet orifice 200I in order to facilitate the inlet of the fluid, and a plane and radial surface S2, i.e., a normal surface joined to the surface S1 so as to extend from the inlet orifice 200I to the outlet orifice 200U.

A 3D centrifugal rotor in three-dimensions is shown in FIG. 2A and the 3D rotor is characterized by blades 303D possessing a substantially three-dimensional profile around a rotational axis X3D of the rotor from the axial inlet orifice 303I towards a substantially radial outlet orifice 303U. In other words, this type of blade 303D is not generated from a simple axial translation with an aerodynamic profile, as is the case for the two-dimensional blades, but can be produced with any profile suitable for maximizing the fluid dynamic performance of the component. This type of 3D rotor has a backing disc 203D to which blades 303D are attached.

FIG. 2B shows a rotor 33D in three-dimensions similar to that in FIG. 2A, but which differs from the former due to the fact that it includes a front disc or backing disc 103D fixed onto the side of the blades 303D opposite to the backing disc 203D. FIG. 2C shows a cross section of the rotor 33D in which the backing disc 103D is fixed to the blades 303D. The backing disc 103D has a profile, either axial or radial, suitable for shaping the throughput spaces for the fluid, and at the same time for guiding it from the inlet orifice 300I to the outlet orifice 300U. In particular, in the case of three-dimensional rotors, the backing disc 103D generally has a substantially "bell-shaped" or "trumpet-shaped" profile, in which the direction normal to its external surface S3 passes gradually from an approximately radial to an approximately axial direction from the inlet orifice 300I to the outlet orifice 300U. However, it should be noted that the form of the backing disc 102D and 103D may vary depending on the particular application.

It is also possible to have configurations possessing characteristics intermediate between a two-dimensional and a three-dimensional rotor depending on the particular application, such as for example rotors possessing two-dimensional blades, and a backing disc with a substantially bell-shaped form, or other configurations.

A centrifugal rotor, either of a two-dimensional type (FIGS. 1B and 1C) or of a three-dimensional type (FIGS. 2B and 2C), is traditionally called "closed" if it possesses a backing disc 102D or 103D. On the other hand, the rotor is commonly called "open" if it does not possess such a backing disc 103D or 203D. In the latter case, it is the stator casing of the turbo-machine that guides the process fluid being propelled within the rotor. The above-mentioned rotors can be produced by assembling their components (by means of welding or brazing), or from a single solid metallic body by mechanical machining (for example by machining or electro-erosion), casting or other means. Each of the above-mentioned types of centrifugal rotor present specific advantages and disadvantages, some of which are summarized below.

Two-dimensional centrifugal rotors, whether open or closed, are simpler and more economical efficient than open or closed three-dimensional rotors due to their geometry. In turn, open centrifugal rotors, whether two or three-dimensional, are simpler and more economical efficient to be produced compared to two or three-dimensional closed rotors because they do not possess a shroud, which traditionally complicates the work necessary to produce them.

On the other hand, rotors of the two or three-dimensional closed type, achieve a better flow control compared with open two or three-dimensional rotors as they possess a well-defined fluid dynamic pathway. Moreover, closed type rotors permit the achievement of a higher performance as they minimize flow losses in relation to the stator casing.

A disadvantage of open or closed two-dimensional centrifugal rotors is the fact that they possess a fluid dynamic performance which is inferior to open or closed three-dimensional centrifugal rotors, because of their geometry.

Another disadvantage of the two or three-dimensional open centrifugal rotors is the fact that they possess a fluid dynamic performance inferior to that for two or three-dimensional closed rotors because of the leakage of fluid between the rotor and the stator housing, which is particularly relevant in multi-stage turbo-machines, in which it is difficult to keep an axial deformation under control.

A disadvantage of the two or three-dimensional closed-type rotors is the fact that they have a maximum peripheral velocity that is lower than that of the two or three-dimensional open type. This is due in particular to the fact that the backing disc creates a centrifugal tension (indicated by Fc in FIGS. 1C and 2C) on the blades due to its radial expansion, which is particularly relevant at high rotational velocities. In particular, above a certain velocity (generally around 350 meters per second, depending on the material and the geometry), the backing disc generates such a high tension in the blades that it can lead to the destruction of the rotor itself.

Thus, two-dimensional open rotors have proved to be the most simple and economical to manufacture, have a high maximum rotational velocity, but at the same time have a low fluid dynamic performance. On the other hand, three-dimensional closed rotors prove to possess the highest fluid dynamic performance, but at the same time are the most complex and expensive to manufacture, and have a limited maximum rotation velocity. Rotors of intermediate type, e.g., two-dimensional closed rotors or three-dimensional open rotors, possess intermediate advantages.

U.S. Pat. No. 4,676,722, the entire content of which is incorporated herein by reference, describes a centrifugal rotor that possesses increased mechanical strength and reduced weight in order to obtain a rotational velocity and a diameter of the rotor that are greater compared with those of traditional rotors. This rotor is produced with a series of scoops formed of a composite material and rigidly fixed to each other in a circumferential direction with respect to its axis of rotation.

One disadvantage of the above-mentioned rotor is the fact that the various scoops comprise reinforcement fibers substantially oriented in a radial direction, which means that it is difficult to balance the circumferential tension due to a centrifugal force Fa (see FIG. 1C) that arises at a high rotational velocity.

A further disadvantage of the rotor of this document is the fact that such a rotor is relatively complex from a mechanical point of view, since it is composed of many different components that must be produced independently and mechanically assembled together. Moreover, this mechanical assembly cannot easily be achieved using automated machines which results in increased manufacturing times and costs.

Another disadvantage of this rotor is the fact that the composite material of the rotor in the region of contact with the flow is not protected from the wear caused by the possible presence of solid particles in the flow, or from possible acid fluids.

Still another disadvantage is the fact that it may prove difficult to achieve the tolerances for each component and for the fixing systems that are necessary for optimum functioning of the rotor at high velocity. Moreover, possible deformation produced by the tensions and forces created during use may lead to problems in operation. In addition, a vibration may occur during operation, caused by wear and/or by imperfect mechanical assembly of the various components.

Patent JP 56132499, the entire content of which is incorporated herein by reference, describes a closed centrifugal rotor which possesses a ring formed of a composite material and arranged at the intake side of the backing disc to attempt to reduce the centrifugal tension produced at high rotational velocity. One disadvantage of this rotor is the fact that such a ring formed of a composite material acts in an extremely localized manner in the region in which it is installed, for which reason its reliability is not particularly high.

Another disadvantage is that appreciable shear forces are generated between the ring and the backing disc at high rotation velocities, due to deformation of the backing disc, so that dangerous cracks can be formed in the backing disc.

Still another disadvantage is the fact that a deformation of the backing disc increases with a rotational velocity, resulting in a risk that the ring may become detached. If this happens, the rotor would disintegrate, thus damaging the parts of the stator of the machine.

Patent JP 9195987, the entire content of which is incorporated herein by reference, describes a centrifugal rotor of the "three-dimensional" type. On the backing disc is bonded a layer of composite material including carbon fiber to increase its rigidity and limit a deformation in the region of the outlet orifice at high rotation velocities. One disadvantage of this rotor is that the rotor does not solve the problem of the centrifugal tension Fc that is generated in the backing disc at high velocities. The increase in velocity obtained through this arrangement is therefore limited for a closed rotor.

Another disadvantage is that, under conditions of maximum velocity, the layer of composite material may become detached from the plate, since the load acts tangentially to the backing disc, generating high shear forces in the bonding surface.

Patent JP 141898, the entire content of which is incorporated herein by reference, describes an open centrifugal rotor which possesses a backing disc with a coaxial cavity to reduce its weight, and an annular element arranged on the peripheral surface of the backing disc in order to reduce its deformation. This annular element is produced of a material having a coefficient of thermal expansion that is lower than that of the rotor.

One disadvantage of this rotor is that, even in this case, this system does not solve the problem due to the centrifugal tension Fc that is generated in the backing disc at high velocities. The increase in velocity obtainable by this arrangement is therefore limited for a closed rotor.

In conclusion, none of the above documents solve the problem of the tensions generated by the backing disc in the blades at high rotational velocities. Therefore, in spite of developments in technology, it is still considered necessary to produce centrifugal rotors of the "closed" type for turbo-machines that can operate at higher rotational velocities, while at the same time guaranteeing sufficient reliability and economy in production and use.

Accordingly, it would be desirable to provide systems and methods that avoid the afore-described problems and drawbacks.

BRIEF SUMMARY OF THE INVENTION

In one exemplary embodiment, it is provided a method for producing a centrifugal rotor that is simpler and more economical compared with known methods, and which permits at the same time the production of a finished product offering higher and better performance.

According to one exemplary embodiment, an impeller for a turbo-machine is provided. The impeller includes a metallic base having a central hole, a back surface and a front surface opposite to the back surface; at least one blade extending on the front surface of the metallic base; a composite shroud attached to the at least one blade such that plural closed paths or vanes are formed by the front surface of the metallic base, the at least one blade and the composite shroud; and a connector configured to attach the composite shroud to the metallic base or the at least one blade.

According to another exemplary embodiment, there is a centrifugal compressor that includes a casing; a shaft provided in the casing and configured to rotate relative to the casing; and at least an impeller attached to the shaft.

According to still another exemplary embodiment, there is provided a method for attaching a composite shroud to an open or closed metallic impeller for a turbo-machine, wherein the impeller comprises a metallic base having a central hole, a back surface, a front surface opposite to the back surface, and at least one blade extending on the front surface of the metallic base. The method includes contacting the composite shroud with the at least one blade such that plural closed paths or vanes are formed by the front surface of the metallic base, the at least one blade and the composite shroud; and fixing the composite shroud to the metallic base and/or the at least one blade.

According to still another exemplary embodiment, there is provided a centrifugal impeller for turbomachinery, made up of a base centrifugal impeller manufactured with at least one first material and comprising a plurality of blades associated with a rear plate, wherein the centrifugal impeller comprises at least one shroud manufactured with a second material different from the at least one first material and associated with the base impeller.

According to yet another exemplary embodiment, there is provided a method for making a centrifugal impeller for turbomachinery. The method includes: making a base centrifugal impeller manufactured with at least one first material and comprising at least one plurality of blades associated with a rear plate; making at least one shroud manufactured with a second material different from the at least one first material; and associating the at least one shroud onto the base centrifugal impeller.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 1A, 1B and 1C show respectively, in axonometric projection, a traditional open two-dimensional centrifugal rotor, a traditional two-dimensional closed centrifugal rotor and an enlarged cross section of the rotor in FIG. 1B;

FIGS. 2A, 2B and 2C show respectively, in axonometric projection, a traditional open two-dimensional centrifugal rotor, a traditional two-dimensional closed centrifugal rotor and an enlarged cross section of the rotor in FIG. 2B;

FIGS. 5A and 5B show schematically, in axonometric projection and in an enlarged partial cross section, a centrifugal rotor in accordance with one exemplary embodiment;

FIGS. 6A and 6B show schematically, in axonometric projection and in an enlarged partial cross section, a centrifugal rotor in accordance with one exemplary embodiment;

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of centrifugal compressors. However, the embodiments to be discussed next are not limited to these compressors, but may be applied to other compressors, pumps and other turbo-machines that include a backing disc and a shroud separated by blades.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figures 3A, 3B:
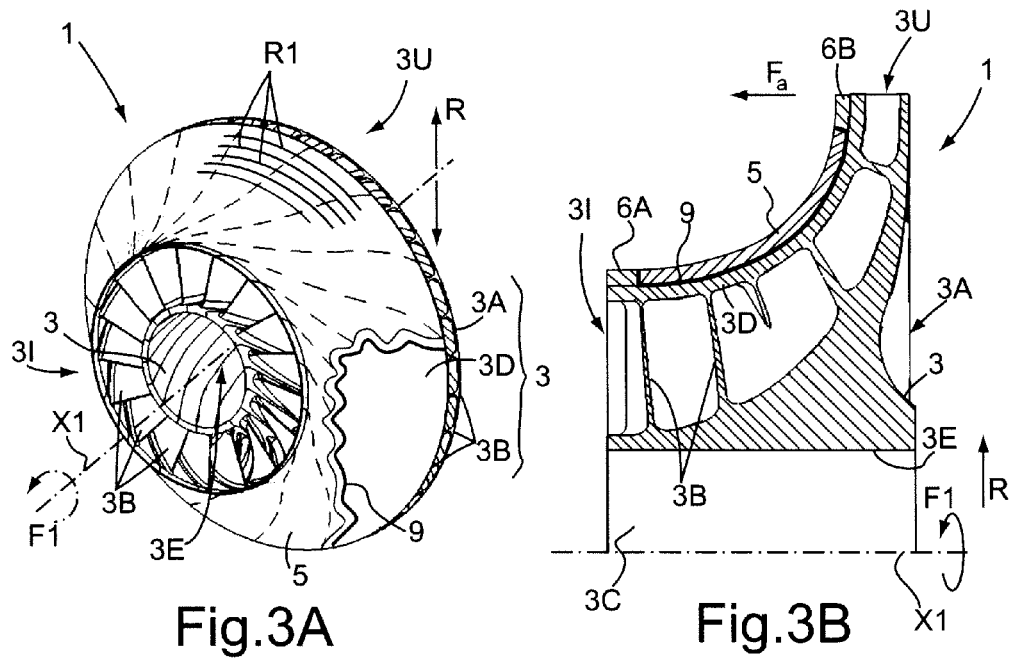
FIGS. 3A and 3B show schematically, in axonometric projection and in an enlarged partial cross section, a centrifugal rotor in accordance with one exemplary embodiment.

In the drawings, in which similar numbers correspond to similar components in all the different figures, the first centrifugal rotor in accordance with one embodiment is generically indicated with number 1 in FIGS. 3A and 3B. The rotor 1 includes a first rotor 3 in three-dimensions, of the "closed" type, and a first additional backing disc 5 (e.g., "shroud") formed of a composite material and attached to first rotor 3.

In the embodiment described in FIG. 3A, the first basic rotor is made entirely from metal and includes a first rear plate 3A, to which are attached a number of first blades 3B. The plate 3A is fitted with a first central bore 3C, coaxial with respect to an axis of rotation X1, on which is mounted a first hub 3E, which serves to mechanically link the first rotor 3 to an axial rotating member, not shown in the figure for clarity. At the end of the blades 3B, opposite to the plate 3A, a first basic backing disc 3D is fitted, to which is attached the first additional backing disc 5, as described below.

Figures 4A, 4B:
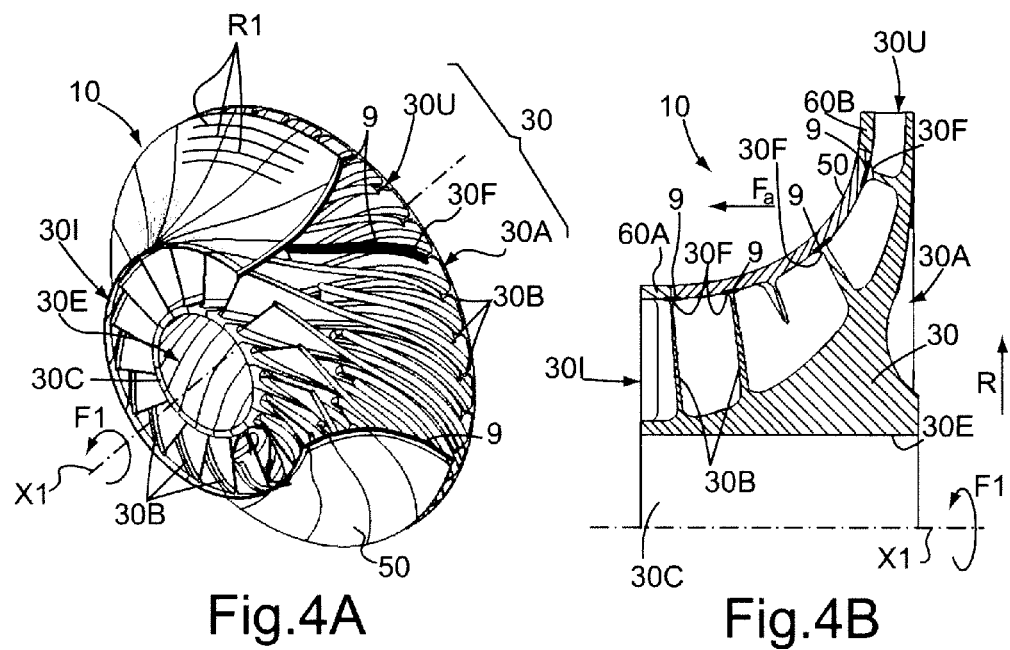
FIGS. 4A and 4B show schematically, in axonometric projection and in an enlarged partial cross section, a centrifugal rotor in accordance with one exemplary embodiment.

In accordance with another exemplary embodiment, a second three-dimensional centrifugal rotor, generically indicated with the number 10 in FIGS. 4A and 4B, includes a second three-dimensional rotor 30 of the "open" type and a second additional backing disc 50 formed of a composite material and attached to the rotor 30. In this embodiment, the second open rotor 30 is made entirely from metal, and includes a second rear plate 30A, to which are attached a number of second blades 30B. The plate 30A also has a second central bore 30C, coaxial with respect to an axis of rotation X1, in which provision is made for a second hub 30E, which serves to mechanically attach the second rotor 30 to an axial rotating member, not shown in the figure for clarity. On the end of the blades 30B opposite to the plate 30A, is attached the second backing disc 50.

Each blade 30B preferably possesses a shaped end (one of which is indicated as 30F in FIG. 4A) being substantially flat, suitable for providing a connecting surface for the second backing disc 50. Such a surface may be produced to have a special shape which varies according to the particular requirements for production or use.

In FIGS. 3B and 4B it should be noted that there is a first anchoring system, including a first ring 6A and 60A, fitted respectively on the first inlet orifice 31 of the first rotor 1 (FIG. 3B) and on the second inlet orifice 301 of the second rotor 10 (FIG. 4B). This arrangement prevents, at least in part, movement of the first and second backing discs 5 and 50 axially when forced by the axial tension Fa. Further, a second ring 6B and 60B can be fitted respectively at the first outlet orifice 3U of the first rotor 1 (FIG. 3B) and the second outlet orifice 30U of the second rotor 10 (FIG. 4B) in order to prevent the second backing disc from being displaced in a radial direction.

The rings 6A, 60A and 6B, 60B may be produced in a single piece respectively on the basic rotor 3 and 30, or may be fixed to them by welding or shrink fit or other means. In this manner, a system of anchoring the shroud that preserves the integrity of the composite material for the backing disc 5, 50 and may improve its centering on the rotor 3, 30 may be obtained.

In accordance with a further exemplary embodiment (see FIGS. 5A and 5B), a third centrifugal rotor 100 includes a third closed basic rotor 300 of the "two-dimensional" type formed of metal and including a third backing plate 300A to which a number of third blades 300B are attached. Analogously to the previous exemplary embodiments, the third plate 300A has a third central bore 300C, coaxial with respect to an axis of rotation X1. A third hub 300E is provided and serves to mechanically link the third basic rotor 300 to an axial rotating member, not shown in the diagram for clarity. On the end of the blades 300B, opposite to the plate 300A, a third basic backing disc 300D is provided to which is fitted a third backing disc 500.

In accordance with yet another exemplary embodiment, a fourth three-dimensional centrifugal rotor 110 (see FIGS. 6A and 6B) is provided and includes a fourth open basic rotor 330 of "a two-dimensional" type and a fourth additional backing disc 550 formed of a composite material is attached to it. In one application, the basic rotor 330 is produced with a fourth backing plate 330A, to which are attached a number of fourth blades 330B. The plate 330A may be additionally fitted with a fourth central bore 330C, coaxial with respect to the axis of rotation X1, and a fourth hub 330E, which serves to mechanically link the fourth basic rotor 330 to an axial rotating member, not shown in the diagram for clarity. At the opposite ends of the blades 330B, on the plate 330A, is attached the fourth additional backing disc 550.

As described above, each blade 330B may be fitted with a shaped end, (one of which is generally shown as 330F in FIG. 6B) suitable for providing a connecting surface for the fourth backing disc 550. In one application, this surface may be produced in a different shaped form, depending on the particular requirements of production or use.

In one exemplary embodiment, the additional backing discs 5, 50, 500 and 550 are made from a material composed of a homogenous matrix possessing at least a first number of reinforcing fibers R1 (shown schematically in part and not to scale in FIGS. 3A, 4A, 5A and 6A), directionally arranged in a largely circumferential manner with respect to axis X1. In this manner, at least in part, the tension induced by the centrifugal force during rotation (see arrow F1) of rotor 1, 10, 100 and 110 is counterbalanced, either in the composite material itself or in the supporting metallic material.

In another exemplary embodiment, it is possible to produce a fiber mesh to reinforce the additional backing disc 5, 50, 500 or 550 in different preferential directions depending on the specific tensions that may arise as a result of a particular application. This can be implemented for two or more layers of fibers or mesh which are, at least partially, superimposed upon one another. For example, it is possible to arrange a second number of reinforcing fibers (not shown in the figures for clarity) in a direction substantially perpendicular to the first fibers R1 in order to compensate at least partially for the radial tension generated by the centrifugal force Fc.

Figure 7A:
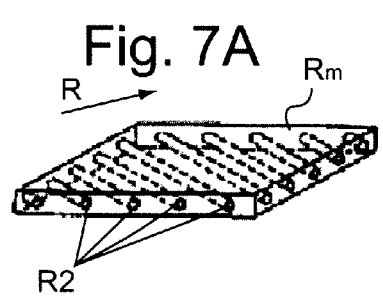
FIGS. 7A to 7B show schematically some composite materials which can be used in accordance with an exemplary embodiment.

FIGS. 7A to 7L schematically show some of the types of fiber or fiber mesh that can be used for the composite material for the backing disc. In particular, FIG. 7A shows a composite material composed of a matrix Rm, in which are embedded "continuous" fibers R2 that can be arranged perpendicularly with respect to the radial direction (see arrow R, also in FIGS. 3B, 4B, 5B and 6B) on the rotor.

Figure 7B:
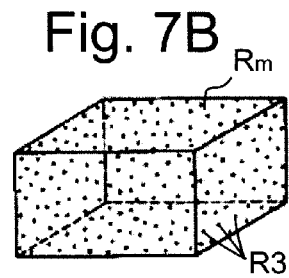
Figure 7C:
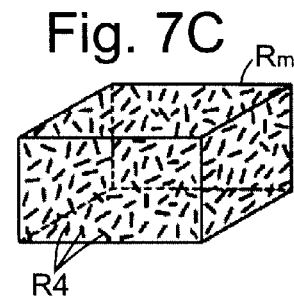

FIG. 7B shows a composite material composed of a matrix Rm in which particulate fibers R3 are embedded, while FIG. 7C shows a composite material composed of a matrix Rm, in which discontinuous fibers R4 are embedded.

Figure 7D:
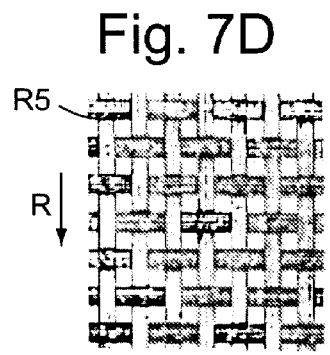
Figure 7E:
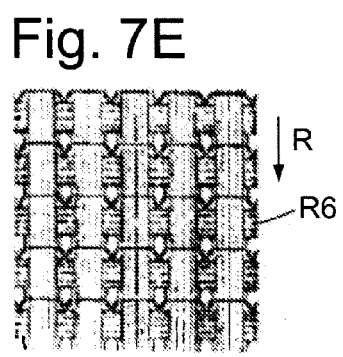

FIGS. 7D and 7E show a composite material composed respectively of a biaxial mesh R5 of fibers and fiber stitches R6 which can be arranged along different directions relative to the rotor 1, 10, 100 or 110.

Figure 7F:
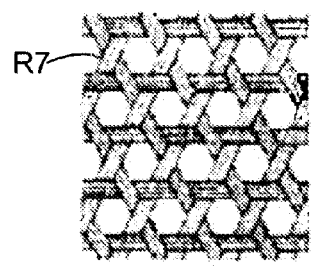
Figure 7G:
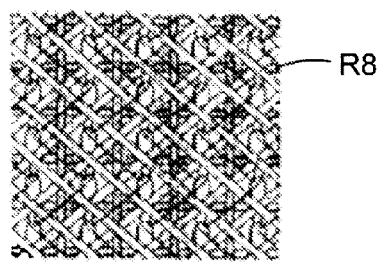

FIGS. 7F and 7G show a composite material composed respectively of a tri-axial mesh R7 of fibers and multi-layer and multi-axial warp stitches R8 in which fibers are arranged in different directions relative to the rotor 1, 10, 100 or 110.

Figure 7H:
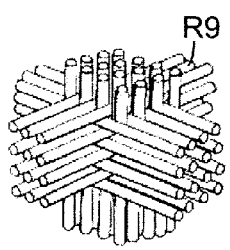
Figure 7I:
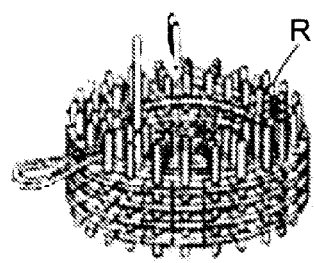
Figure 7L:
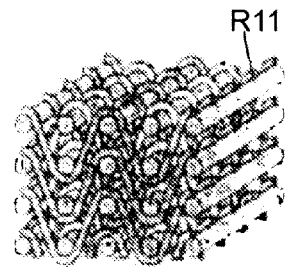

FIGS. 7H, 7I and 7L show a composite material composed respectively of a three-dimensional braid of fibers R9, in a three-dimensional cylindrical construction R10 and in a three-dimensional braided construction of fibers R11 that also, in these cases, can be arranged in various directions on the rotor 1, 10, 100 or 110. Alternatively, a second additional material can include either only fibers or only a polymer material, as described above.

It should also be noted that innumerable types of synthetic fiber have been developed possessing specific characteristics, depending on particular applications, that can be used in composite materials for the backing disc. For example, Dyneema® (also known as "Gel Spun Polyethylene", or high density polyethylene) is a synthetic fiber which is particularly suitable for the production of towing cables, and which is used for sports applications such as kite surfing, paragliding, climbing and for sport or professional fishing, and for the production of bullet-proof vests. Spectra® is a similar fiber with regard to material and composition. Another fiber is Nomex®, a material based on meta-aramid, which is flame-resistant. This material was developed by DuPont. Chemically, it can be considered as an aromatic nylon, a meta-variant of the para-aramid Kevlar. Other types of fibers may be found on the market that are particularly suitable as reinforcement for the composite material in accordance with the exemplary embodiments.

The matrix, when it is present, may be made from a polymer material including at least in part a thermo-setting or thermoplastic polymer. In an exemplary embodiment, the fibers of the matrix may be arranged so as to present a definite anisotropy in order to reinforce the backing disc, in accordance with preferential directions based on the tensions to be counteracted, so as to optimize the strength and rigidity, depending on the particular application.

The homogenous matrix, when used, is preferably produced in a polymer material suitable for holding the reinforcement together, uniformly distributing the tension between the fibers and preferably providing high resistance to high temperatures and wear. Furthermore, the matrix can be produced with a low specific mass or density, so as to reduce the weight of the backing disc, and hence the centrifugal force generated in it. The polymer material for the matrix can include organic, natural or synthetic substances, the principal components of which are high molecular weight polymers, the molecules of which comprise a large number of fundamental units (monomers), connected by various chemical bonds, but for the most part of a covalent nature. Structurally, they may be formed of linear or branched chains, or even greatly entangled with one another, or three-dimensional matrices, composed principally of atoms of carbon and hydrogen and, in some cases, oxygen, nitrogen, chlorine, silicon, fluorine, sulfur or other atoms. In general, polymer materials form a wide family of hundreds and hundreds of different substances, so that it is not possible to exclude different polymer materials depending on particular applications or uses.

It may also be possible to add one or more auxiliary compounds or nano-particles to the polymer material, that have different functions depending on the specific application, such as for example, to stabilize, preserve, fluidize, colorize, decolorize and/or protect the polymer from oxidation.

In one exemplary embodiment, the polymer material for the matrix includes, at least in part, a thermoplastic polymer such as for example, PPS (polyphenylene sulfide), PA (polyamide or nylon), PMMA (polymethyl methacrylate), LCP (liquid crystal polymers), POM (acetal resin), PAI (polyamide imide), PEEK (polyether-ether-ketone), PEKK (polyether-ketone-ketone), PAEK (polyaryl-ether-ketone), PET (Polyethylene tetraphthalate), PC (polycarbonate), PE (polyethylene), PEI (Polyether-imide), PES (polyethers [Trans: PES normally refers to polyether sulphones]), PPA (polyphthalamide), PVC (polyvinyl chloride), PU (polyurethane), PP (polypropylene), PS (polystyrene), PPO (polyphenaline oxide), PI (poly-imide,
available also in thermosetting form) or others.

In another exemplary embodiment, the polymer material of the matrix may include, at least in part, a thermo-setting polymer such as, for example, epoxide, phenolic, polyester, vinyl ester, amine, furan, PI (poly-imide; also produced as a thermoplastic), BMI (bismal imide), CE (cyanate ester), Phthalanonitrile or others.

In accordance with another exemplary embodiment, the matrix is composed of a ceramic material (such as, for example, silicon carbide, alumina or others) or also, at least in part, of a metal such as, for example, aluminum, titanium, magnesium and their alloys or others. These last materials for the matrix possess a higher resistance to temperature and ageing, but at the same time, have a higher density and a higher cost compared with polymer materials.

In accordance with an exemplary embodiment, the additional backing discs 5, 50, 500 and 550 are respectively attached to the basic rotors 3, 30, 300 and 330, respectively, to form open or closed impellers or two or three-dimensions type impellers. The backing discs (shroud) are attached, for example, to the blades by means of an anchoring layer, indicated schematically, and not to scale by layer 9 in FIGS. 3A to 6B. The above-mentioned matrix compositions that are used for the shroud may be modified with possible additives, so as to increase its bonding properties.

In accordance with another exemplary embodiment, the anchoring layer 9 is produced by a glue or a polymer resin, possessing high adhesive characteristics, depending on the specific application. This latter example is particularly light, and is easy and economical to produce, compared with the mechanical type of anchoring, in the event that they are able to guarantee the bonding of the backing disc to the basic rotor. Nevertheless, these adhesives or resins are subject to ageing, and the so-called viscous creep, which is accentuated at high temperatures.

Further anchoring systems of a mechanical type or other type are discussed next. FIGS. 8A to 10B illustrate some of the mechanical anchoring systems. These systems are configured to prevent the detachment of the backing disc 5, 50, 500 or 550 from its respective basic rotor 3, 30, 300 or 330, due in particular to the axial force Fa, in order to facilitate bonding and, at the same time, reduce the mechanical loads and deformation at high rotation velocities. These mechanical systems permit in general the avoidance of viscous creep, and are not prone to deterioration over time and are therefore shown to be advisable in all cases in which the adhesion layer is produced with a resin, an adhesive or a polymer-based matrix. At the same time, the use of such systems adds a certain amount of mass to the rotor and, moreover, requires the production of bores in the backing disc, cutting through any fibers and therefore causing a local weakening of the composite material. In addition, it may be necessary to provide possible locking systems to prevent their accidental detachment.

Figure 8A:
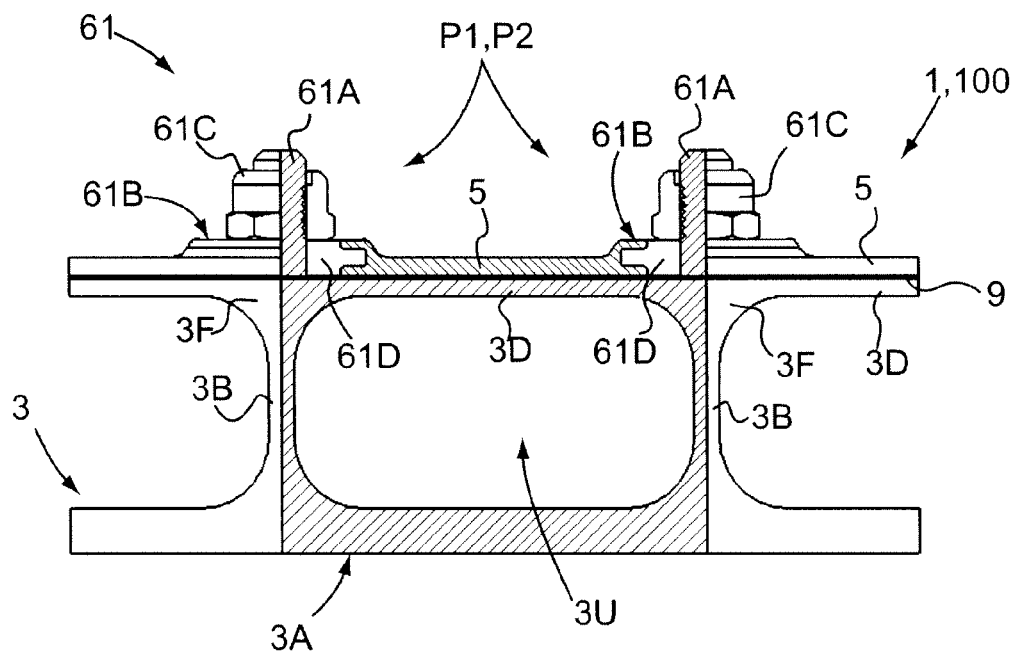
FIGS. 8A to 11B show schematically respective anchoring systems in accordance with different exemplary embodiments.

In one exemplary embodiment, a first anchoring system 61 (FIGS. 8A and 8B) is produced by using bolts. FIG. 8A shows a view partially in cross section across line XIII of FIG. 13 of the first rotor 1. The anchoring system 61 includes a number of bolts 61A (only two of which are shown in the figure) produced integrally on the first basic backing disc 3D in suitable positions P1 or P2 or both (see FIG. 13). These bolts 61A are inserted in appropriate holes 61B drilled in the respective positions P1 or P2 on the additional backing disc 5 and locked by a nut 61C screwed onto each bolt 61A. A metal insert 61D may be fitted in the hole 61B in order to reduce the compression and the effect of shear in the material in the vicinity of the hole, which is particularly serious in the case of a fiber composite material. The bolting system 61 allows the control of the preloading force, reducing the risk of damaging the material of the second additional backing disc.

Figure 8B:
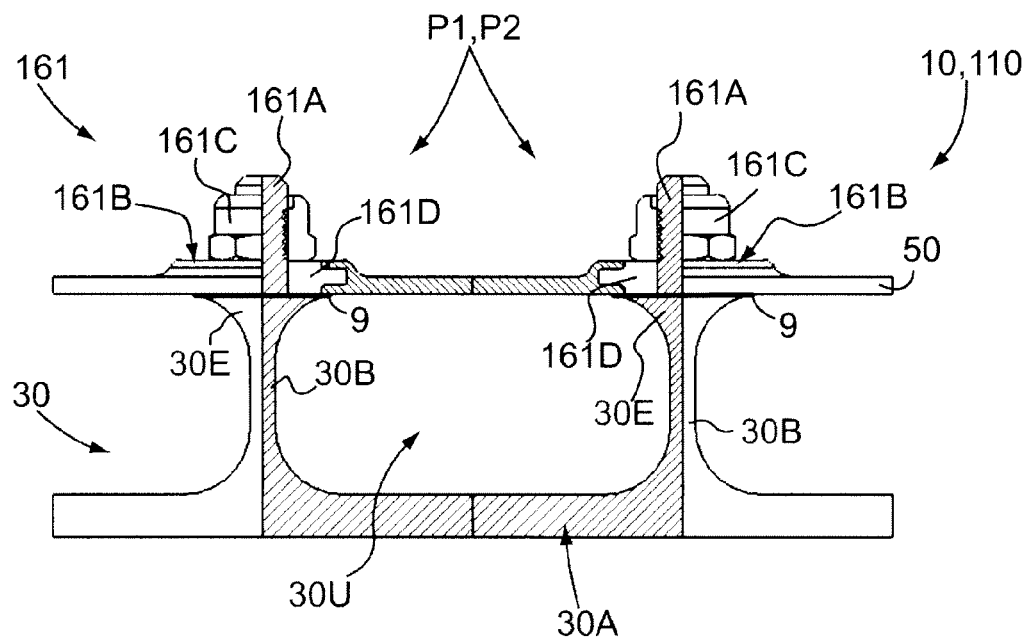
Figure 13:
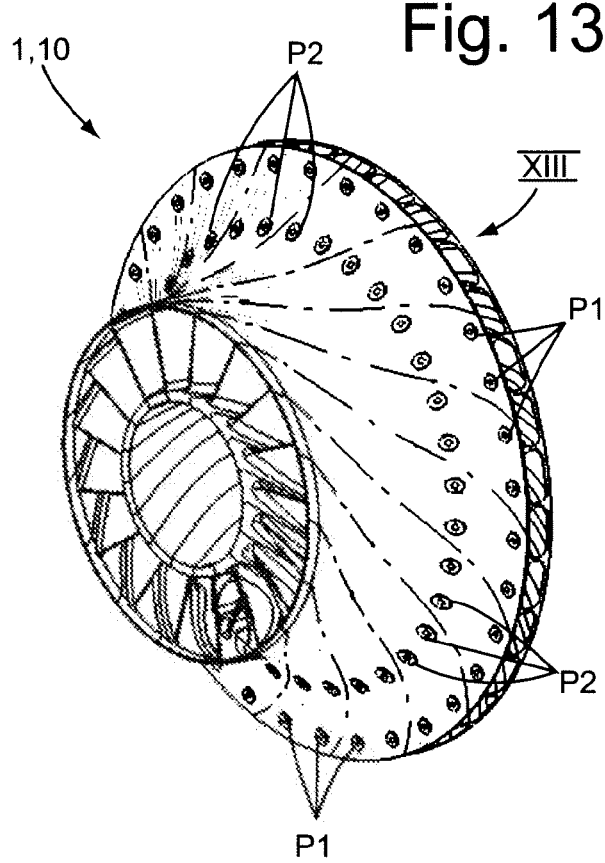
FIG. 13 shows schematically, in axonometric projection, a centrifugal rotor produced according to one of the embodiments in FIGS. 8A to 11B.

FIG. 8B shows a partial cross sectional view along line XIII of FIG. 13 of the second rotor 10. A bolting system 161 is produced in a manner similar to the bolting system 61, but with the difference that a number of screws 161A are produced integrally with the shaped ends 30E of the blades 30B, or are attached thereto (for example, by welding or similar means). In this case, the screws 161A are inserted in respective holes 161B in the second additional backing disc 50 and are locked by a nut 161C screwed onto each screw 161A. An insert 161D may be provided in each hole 161B.

Alternatively, it is also possible to produce, at the location of the screw 61A or 161A, respective threaded holes (not shown in the figure for clarity) in the basic rotor 3 or 30, into which a corresponding screw can be inserted. In this manner, the assembly stage is improved, especially in the vicinity of the inlet orifice, but at the same time, there is a risk of weakening the material of the basic rotor.

Figure 9A:
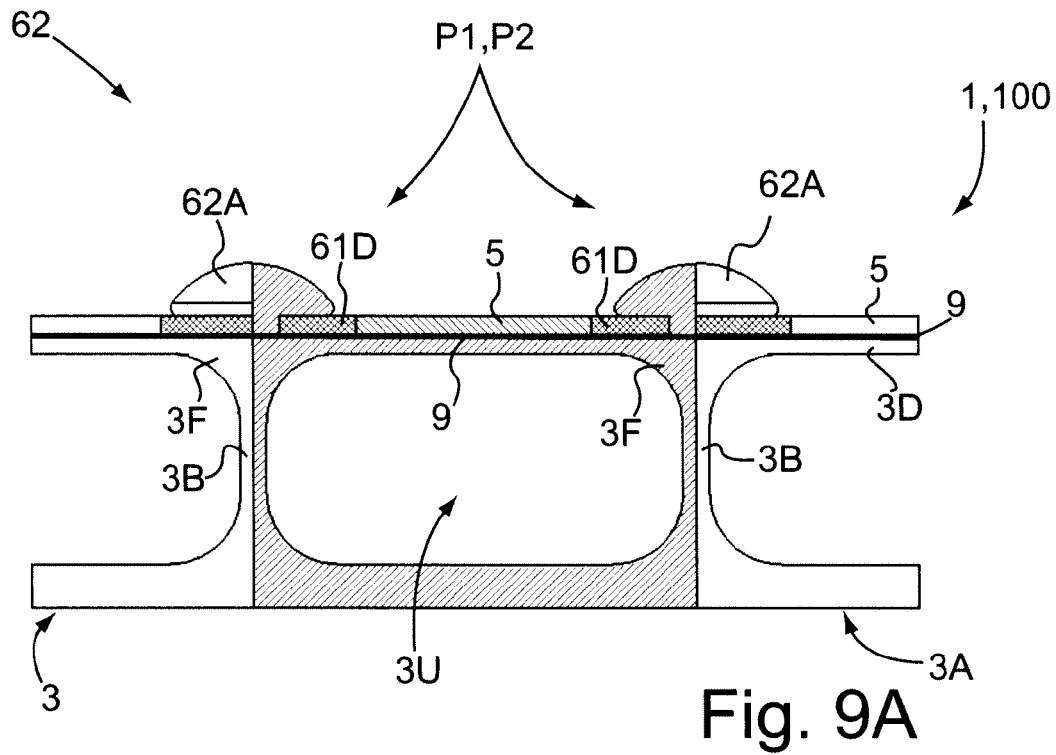
Figure 9B:
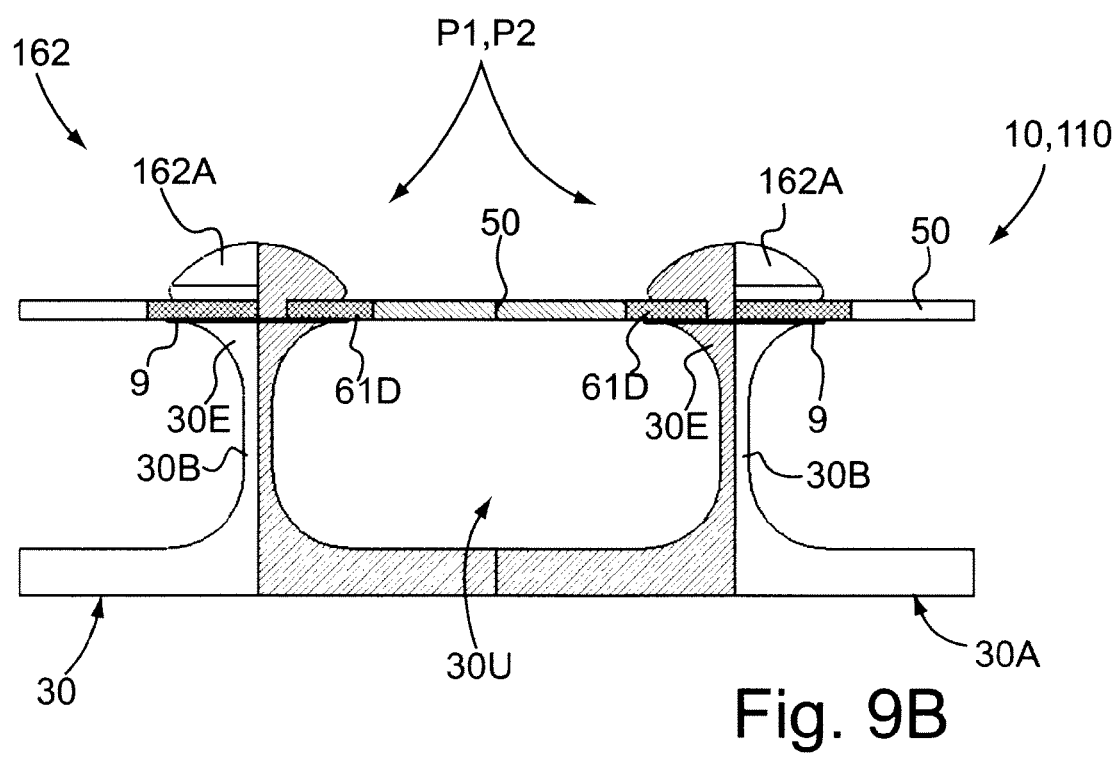

In another exemplary embodiment shown in FIG. 9A, a third anchorage system 62 is produced by riveting and includes a number of pins 62A produced integrally with the first basic backing disc 3D of the first rotor 1 in suitable positions P1 or P2 or both (see FIG. 13). The first backing disc 5 is attached to these pins 62A and the head of the pin can subsequently be riveted over. FIG. 9B shows a riveting system 162, similar to the riveting system 62, but with the difference that a number of pins 162A is produced integrally with the shaped end 30E of the blades 30B of the second basic rotor 30, or attached to it.

The anchoring system produced by riveting systems 62 and 162 is shown to be economical and easy to implement with respect to the previous bolting systems 61 and 161. Moreover, the later does not present risks, e.g., either coming loose or damaging the second material if an insert is fitted in each bore of the shroud.

Figure 10A:
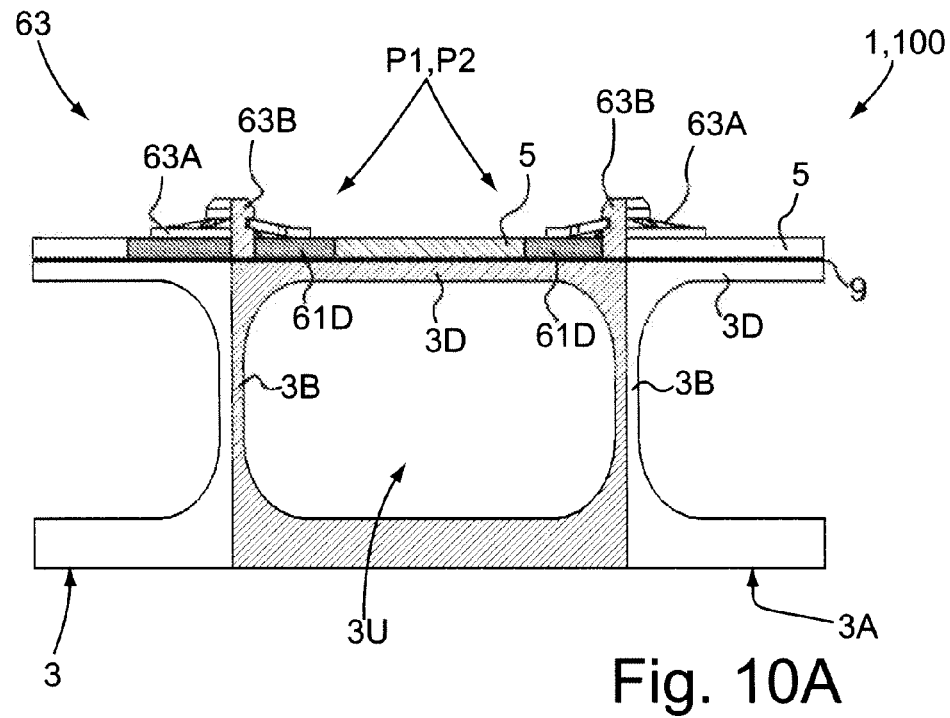

In another exemplary embodiment shown in FIG. 10A, a fourth anchoring system 63 is produced by using a number of retaining rings or "Seeger rings" 63A, possibly embedded in the composite material of the first backing disc 5 and arranged at positions P1 or/and P2 so as to engage with respective projections 63B, produced integrally with the backing disc 5.

Figure 10B:
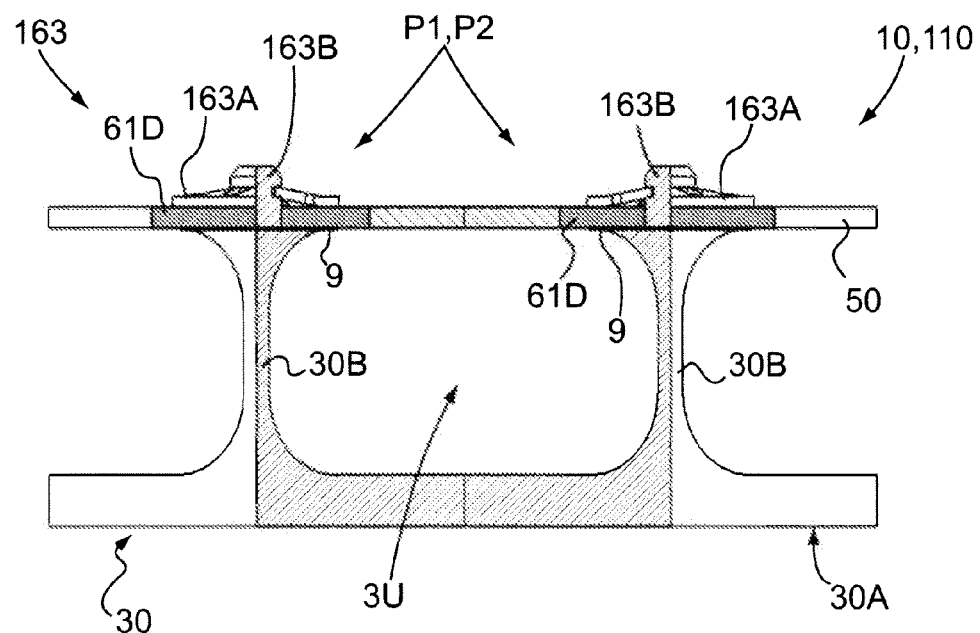

FIG. 10B shows an anchoring system 163 produced similar to system 63 but a difference is that a number of retaining rings or "Seeger rings" 163A, possibly embedded in the composite material in the second backing disc 30 of the second rotor 10, and arranged at positions P1 and/or P2 so as to engage with the respective projections 163B, are produced integrally with the shaped ends 30F of its blades 30B or produced thereon.

It should be noted that the above mechanical anchoring systems find a particularly versatile application in the case of closed basic rotors, since their components can be easily fitted in any position on the basic backing disc, and not only in correspondence with the blades.

Figure 11A:
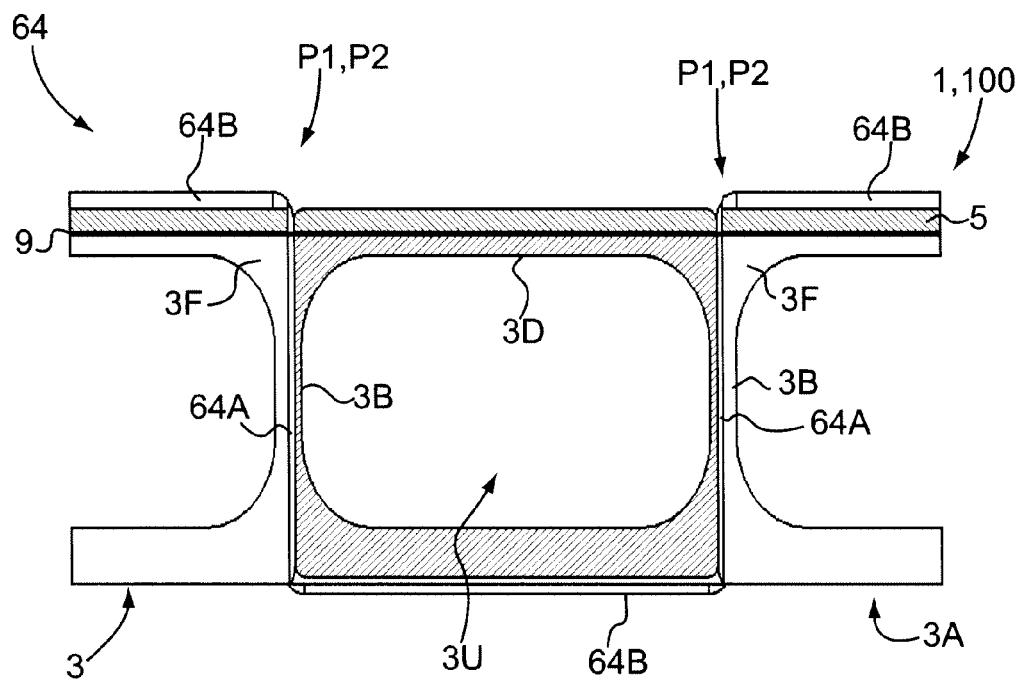
FIG. 11C shows schematically an enlarged detail, in axonometric projection, partially in cross section, of the anchoring system for FIG. 11B according to an exemplary embodiment.

In another exemplary embodiment shown in FIG. 11A, a fifth anchoring system 64 includes a number of holes 64A passing through the blades 3 of the first centrifugal rotor 1 at positions P1 and/or P2, in such a manner that "plugs" or filaments 64B of more fibers can be inserted there to anchor the first backing disc 5 to the first basic backing disc 3D, owing to the tensile strength of the plugs 64B. The plugs 64B can be embedded at least partially in the composite material of the backing disc 3, or can be arranged on top of it. A resin, or a low viscosity matrix may additionally be injected inside each hole 64A in order to improve the adhesion and form a continuous structure with the backing disc.

Figure 11B:
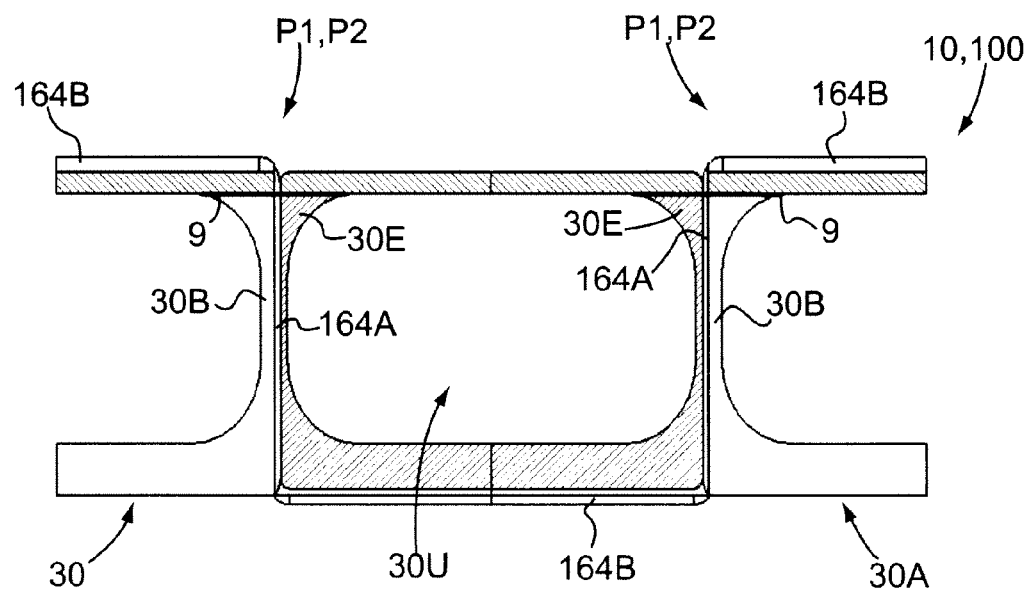

FIG. 11B shows an anchoring system similar to system 64 but with a difference that a number of holes 164A are formed to pass through the blades 30B of the second rotor 10 so that "plugs" or filaments of more fibers can be inserted therein, in order to anchor the second backing disc 50 to the shaped ends 30E of the blades 30B, owing to the tensile strength of the plugs 164B. The anchoring systems 64 and 164 are particularly light and effective.

Figure 11C:
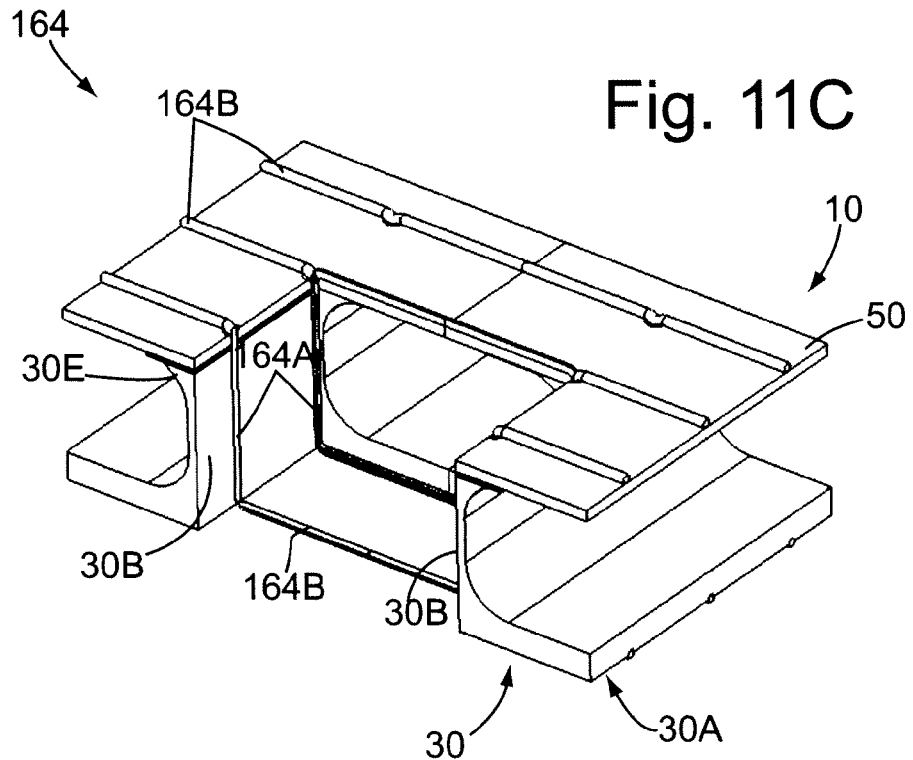

In another exemplary embodiment illustrated in FIG. 11C, which shows an axonometric view of the system in FIG. 11B, it is noted that plugs 164B are inserted alternatively into the holes 164A produced in the blades 30B of the second rotor 10.

Figure 12:
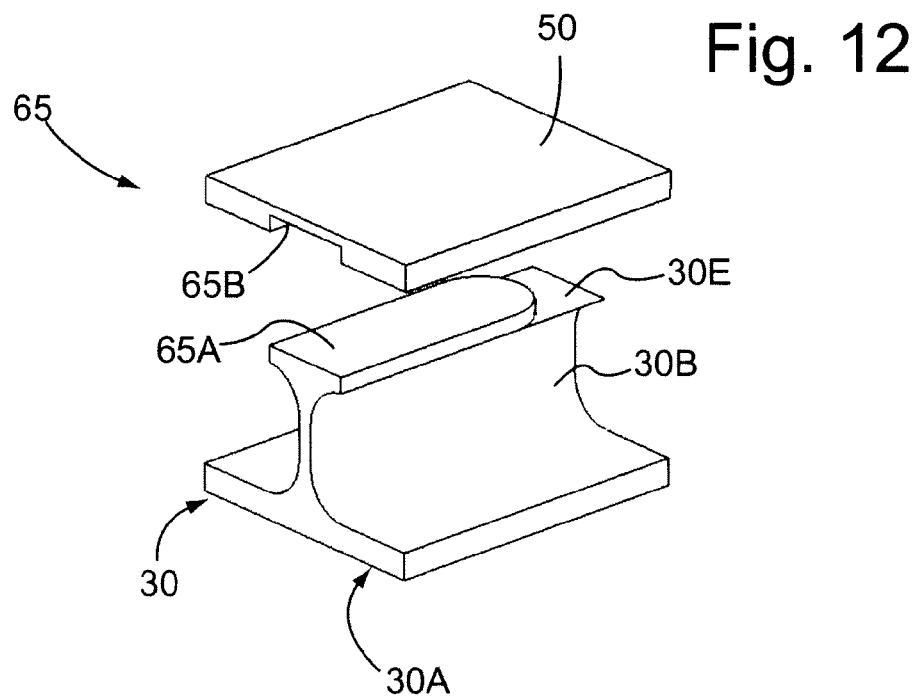
FIG. 12 shows schematically an anchoring system in accordance with a further exemplary embodiment.

In another exemplary embodiment shown in FIG. 12, a sixth anchoring system 65 includes a bayonet style coupling between one shaped end 30E of a blade 30B of the second rotor 10 and an internal surface of the second additional backing disc 50. This coupling 65 may be carried out by means of projections 65A, that extend along at least part of the shaped ends 30E of the blades, and couple with respective molded hollows 65B formed in the second backing disc 30, or vice versa. Such a coupling may be carried out by using any other type of element, such as for example, dovetail joint or other joints.

The above-mentioned mechanical anchoring systems 60, 61, 161, 62, 162, 63, 163, 64, 164 and 65 are here described only as examples, and they can be of any other type suitable for the purpose of attaching the shroud to the blades of an impeller. Such systems can furthermore be produced in isolation, or in combination with each other, and using the anchoring layer 9, depending on the specific requirements of construction and use. In addition, such mechanical anchoring systems 60, 61, 161, 62, 162, 63, 163, 64, 164 and 65 have been described with reference to the first and second rotor 1, 10. It is however understood that they can also be applied or used for the production of the third and fourth rotor 100 and 110 in a similar manner.

FIG. 13 shows an axonometric view of the first centrifugal rotor 1, or the second rotor 10. The above-mentioned suitable positions P1 and P2 for the components 60A, 60B; 61A, 61B; 61D; 62A, 62B, 62C; 63A, 63B; 64A; 65A, 65B are shown schematically in the vicinity of the outlet orifice 3U or 30U. In other words, the connecting mechanisms discussed above may be distributed at a trailing edge of the blades or shroud. However, the connecting mechanisms may also be distributed at other locations. Locations P1 and/or P2 may be arranged at other positions on the rotor depending on the particular applications, such as for example, on the blades 30B or 330B, or on the rings 60A or 60B, or other positions.

Figure 14:
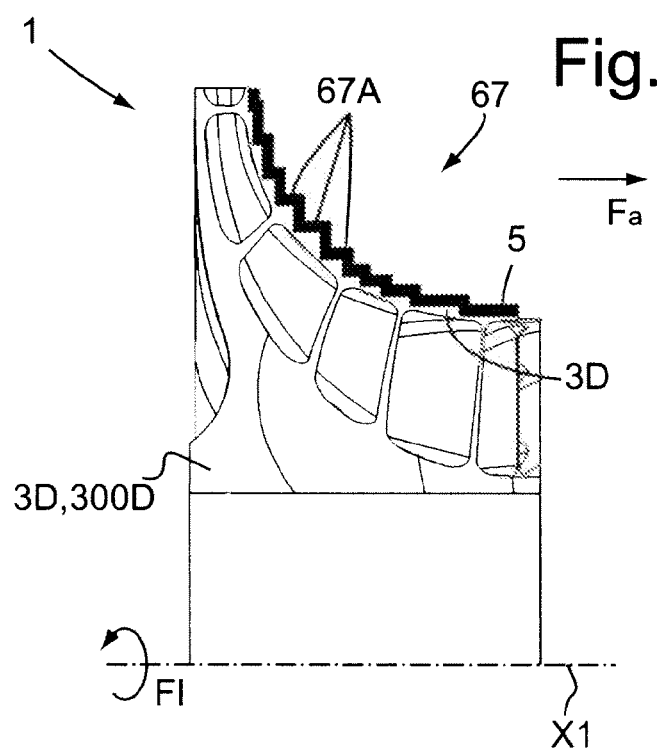
FIG. 14 shows schematically an enlarged view in cross section of yet another exemplary embodiment.

According to an exemplary embodiment illustrated in FIG. 14, a step mounting system 67 is configured for coupling the first basic rotor 3 to the first additional backing disc 5. The mounting system 67 includes a number of planes and cylindrical surfaces 67A, which are concentric with respect to the axis X1 on the basic backing disc 3D. Elements 67A serve to reduce the axial force Fa generated on the backing disc 5 due to the centrifugal force Fc at high rotation velocities. Such shaped coupling system 67 can also be produced in other situations, that is to say, with the three-dimensional open basic rotor 30 or with the two-dimensional closed or open basic rotor 300, 330. In particular, in the case of open basic rotors, in two or three-dimensions, such planes can be produced on the shaped ends of the blades. This coupling can be produced in combination with at least one other of the above-mentioned anchoring systems.

The production of a centrifugal rotor 1, 10, 100, 110 in accordance with the exemplary embodiments provide that the basic rotor 3, 30, 300, 330 may be obtained from a single piece by means of automated machining, or may be made by assembling several components together, as described above. The additional backing disc 5, 50, 500, 550 can be formed in a mold for composite material, and in this case the fibers R1-R11 may be positioned in the mold by hand ("manual layup" or other) or by means of automated machines ("filament winding", "automatic fiber placement" or similar). Alternatively, the additional backing disc 5, 50, 500, 550 can be formed on the basic backing disc 3D, 300D, or on the shaped ends 30F, 330F of the blades 30B, 330B.

Other novel anchoring systems and corresponding method for fixing the shroud to the blades are now discussed with reference to FIGS. 15-37.

Figure 15:
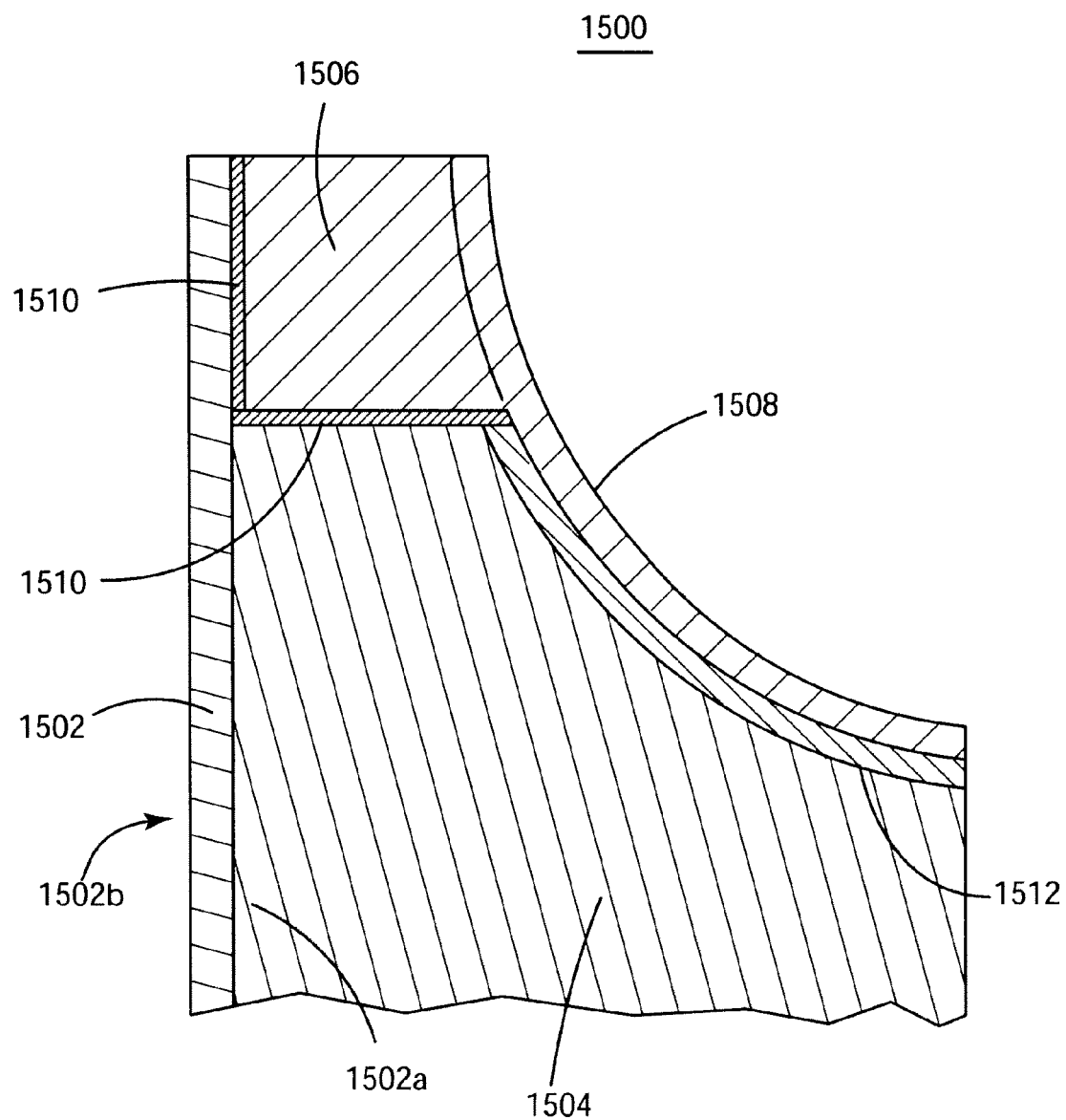
FIG. 15 is a schematic view of an impeller having a blade partially made of a composite material and partially made of a metal according to an exemplary embodiment.

According an exemplary embodiment, a part of an impeller 1500 is illustrated in FIG. 15. The impeller (sometimes called a rotor) 1500 includes a metallic base (backing disc) 1502 which supports plural blades and a shroud 1508. The metallic base 1502 has a front face 1502a and a back face 1502b. The blades are formed on the front face 1502a. Each of the plural blades may have a part 1504 made of a metallic material and a part 1506 made of a composite material. In one application, the trailing edge is made of the composite material and thus, reference number 1506 indicates the trailing edge. The trailing edge is defined relative to the flow of a gas in the compressor. For example, the first part of the blades that contact the gas is the leading edge and the last part of the blades that contact the gas is the trailing edge. In the exemplary embodiment shown in FIG. 15, the leading edge is made of a metallic material. However, it is possible that the leading edge is made of the composite material and the remaining part of the blade is made of the metallic material. Alternatively, it is possible that both the leading and trailing edge of the blade is made of the composite material and the remaining part (between the trailing edge and the leading edge) is made of the metallic material. Also, it is possible that selected blades are made to include the composite material while the other blades are made entirely from the metallic material. In one example, every other blade is made partially to include the composite material.

The metallic part 1504 is formed and attached to the metallic base 1502 by conventional methods, as has been discussed above. However, the composite part 1506 may be attached to the metallic base 1502 as discussed next. In one application, the composite part 1506 is formed independent of the composite shroud 1508 and attached to the metallic base 1502 and the metallic part 1504 by a glue or a composite strip 1510. In another application, the composite part 1506 is formed integrally with the shroud 1508 (as shown in FIG. 15) and then attached to the metallic base 1502 and the metallic part 1504. The same or different glues or composite strips 1512 may be provided between the shroud 1508 and the metallic part 1504. As will be discussed later, bolts, pins, or other means may be used in combination with the present method for attaching the shroud and the composite part to the metallic base and the metallic part. It is also noted that the metallic part with the composite part form together the blades of the compressor.

Figure 16:
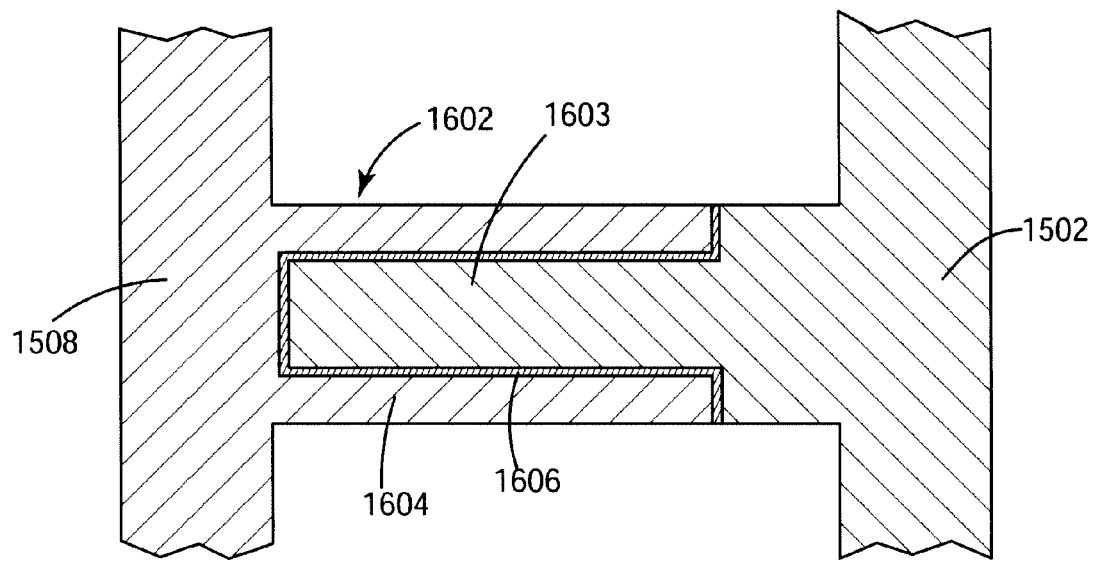
FIG. 16 is a schematic view of a composite shroud having composite brackets that attach to a metallic blade according to an exemplary embodiment.

In another exemplary embodiment illustrated in FIG. 16, an impeller 1600 has the entire blade 1602 made of a metallic material. However, the trailing edge part 1603 (now made of a metallic material) of the blade 1602 has a reduced thickness relative to a desired total thickness. In this way, a composite part 1604 attached to the shroud 1508 can be connected to the thin metallic part to achieve the desired total thickness of the blade 1603. In other words, the trailing edge of blade 1602 has the inner part made of the metallic material and the outer part made of the composite. The inner part and the outer part are glued to each other by a layer 1606, which also may be a composite strip that is cured to fix the inner part to the outer part. The geometry of the inner part 1603 (metal) and the outer part 1604 (composite) (bracket) shown in FIG. 16 may differ depending on the application. Similar to the previously discussed embodiment, other methods (e.g., bolts, pins, etc.) may be combined with the present method for securing the shroud to the blades.

Figure 17:
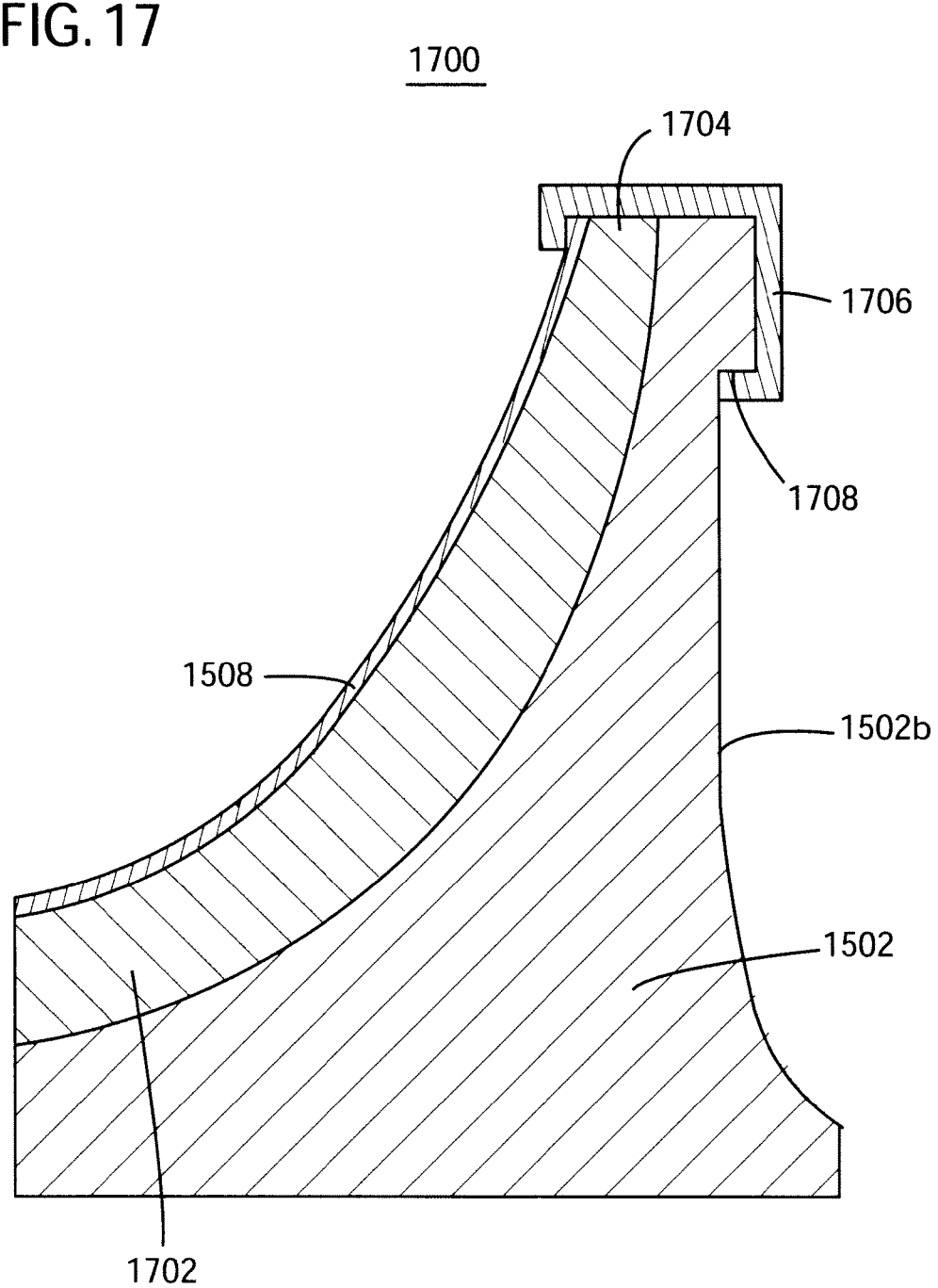
FIG. 17 is a schematic view of a composite shroud attached to a metallic base with composite stripes according to an exemplary embodiment.

According to an exemplary embodiment shown in FIG. 17, an impeller 1700 may have the shroud 1508 attached to blades 1702 by conventional methods. In addition, a trailing edge 1704 of the blades 1702 is provided with a further connecting means 1706. The connecting means 1706 may be a composite strip that is attached in the following way. Suppose that the shroud 1508, which is made of a composite material, has been cured such that the shroud is solid. Blade 1702 may or may not include a trailing edge part that is made of a composite material. If the blade 1702 includes such a trailing edge, assume that the composite part of the trailing edge of the blade is also cured, i.e., hard.

One or more composite strips 1706, which are flexible prior to curing, are provided to cover the trailing edge of the shroud 1508, the trailing edge of the blade 1702, and the trailing edge of the metallic base 1502. One composite strip 1706 may be applied for each blade. In this case, the metallic base may have a step 1708 built into the back face 1502b. An end of the composite strip 1706 may be configured to follow the profile of the step 1708. Instead of a step 1708 another profile may be used that would stop the strip 1706 from coming off the metallic base 1502 during the rotation of the impeller. It is noted that the uncured composite strip 1706 is flexible and may be molded as desired to follow a desired profile. Once all the composite strips 1706 are in place, they are cured to become hard and to fix in place the shroud 1508. Together with this method other methods may be used to also fix the shroud to the blades. These methods are those discussed above or those to be discussed next.

Figure 18:
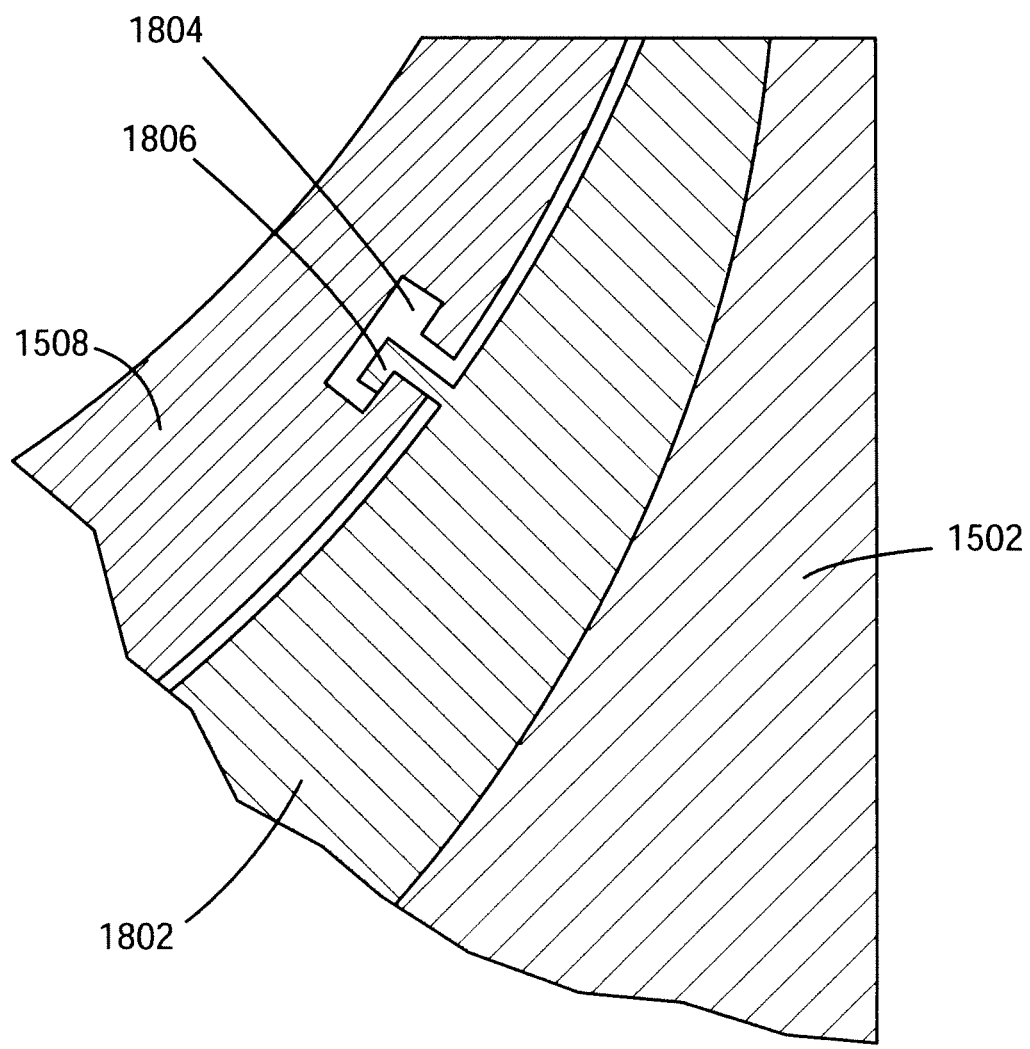
FIG. 18 is a schematic view of a composite shroud having depressions to accommodate a head according to an exemplary embodiment.

According to an exemplary embodiment illustrated in FIG. 18, the impeller 1800 has the composite shroud 1508 made to have a certain minimum thickness such that at least a cavity 1804 may be formed. A corresponding head (hook) 1806 may be formed or attached to blade 1802 and the head 1806 may enter inside cavity 1804. Cavity 1804 and head 1806 may be configured to lock to each other when the shroud 1508 is rotated in a given direction (e.g., the normal rotation direction when the compressor is operational). In this way, the trailing edge of the blade 1802 is attached to the trailing edge of the shroud 1508. One or more such cavities and corresponding heads may be formed between the shroud and a blade.

It is noted that for the embodiments discussed with regard to FIGS. 15-18, the trailing edge of the blade is either made of the composite material or is attached in a specific way to the shroud. However, the same is true for the other parts of the blades.

Figure 19:
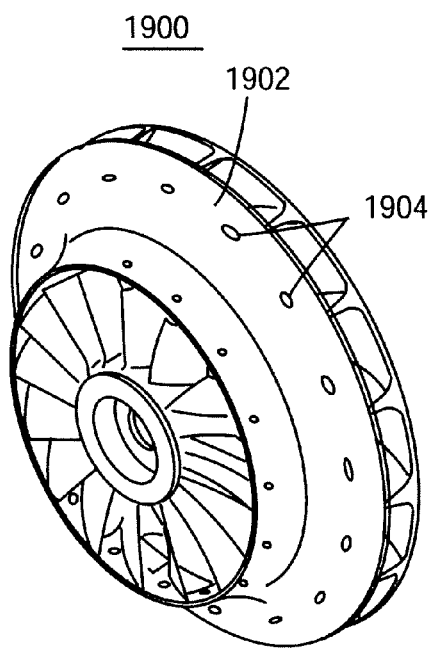
FIGS. 19-23 are schematic views of a composite shroud having plural holes and pins or hooks that engage the plural holes according to an exemplary embodiment.
Figure 20:
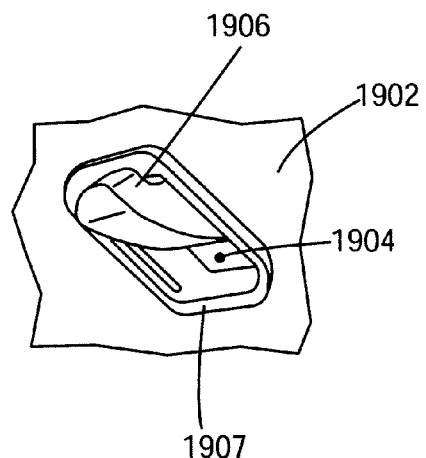
Figure 21:
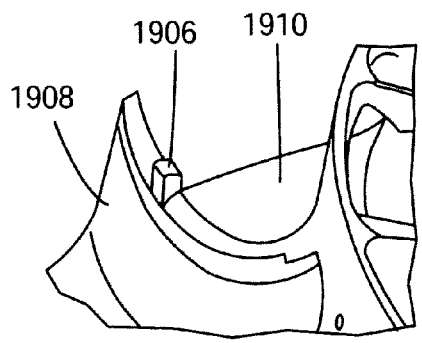

According to another exemplary embodiment illustrated in FIG. 19, an impeller 1900 may have a shroud 1902 provided with plural holes 1904. For clarity, one hole 1904 is shown in FIG. 20. A hook 1906 is shown entering through the hole 1904 for fixing in place the shroud. Hook 1906 is shown in FIG. 21 formed on a trailing part of a blade 1908. Blade 1908 is shown attached to a metallic base 1910. A metallic or composite insert 1907 may be provided around hole 1904 for protecting the composite shroud from damage.

Figure 22:
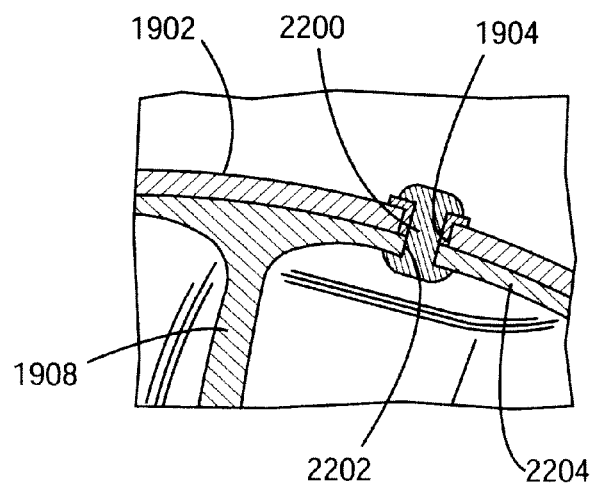

FIG. 22 shows another exemplary embodiment in which instead of a hook 1906 a clip 2200 is formed to attach the shroud 1902 to the blade 1906. Clip 2200 may be provided through a hole 2202 in a ring 2204 and may be riveted to both ends to fix the shroud 1902. In one application, edges of holes 1904 (see FIG. 20) may be formed of a metallic material for preventing the composite material to experience any damage.

Figure 23:
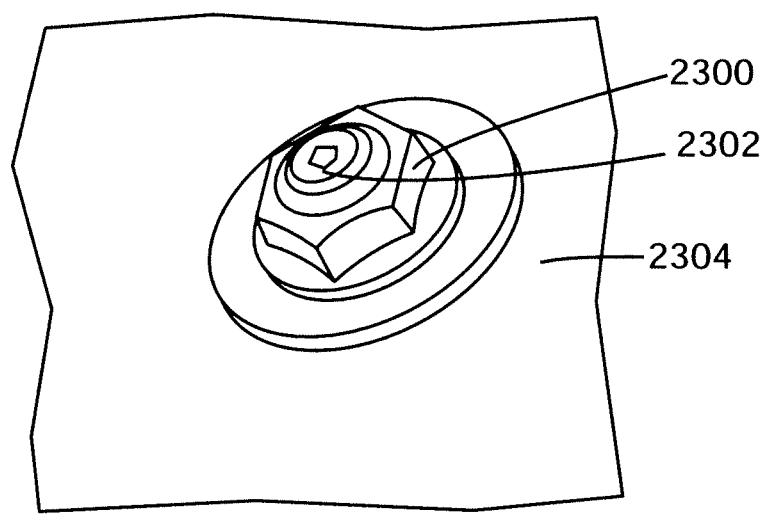

According to a further exemplary embodiment illustrated in FIG. 23, instead of using a pin or hook for securing the shroud to the blades, a threaded pin may be formed on the blade. In one application, the threaded pin is formed only on the trailing edge of the blade. In this way, a nut 2300 is applied to the threaded pin 2302 to fix the shroud 2304 to the blades.

Figure 24:
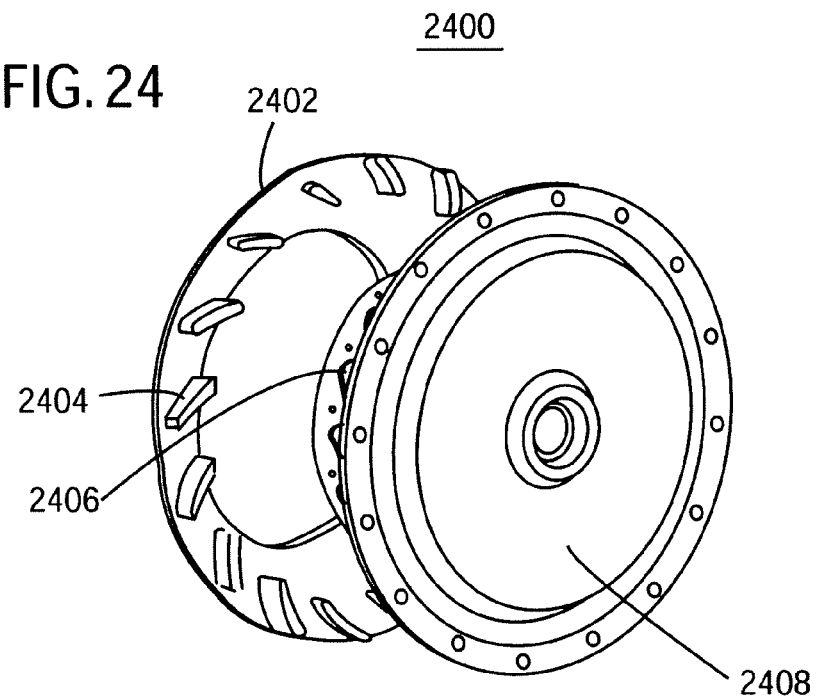
FIGS. 24 and 25 are schematic views of a composite impeller having blade end portions made of a composite material according to an exemplary embodiment.
Figure 25:
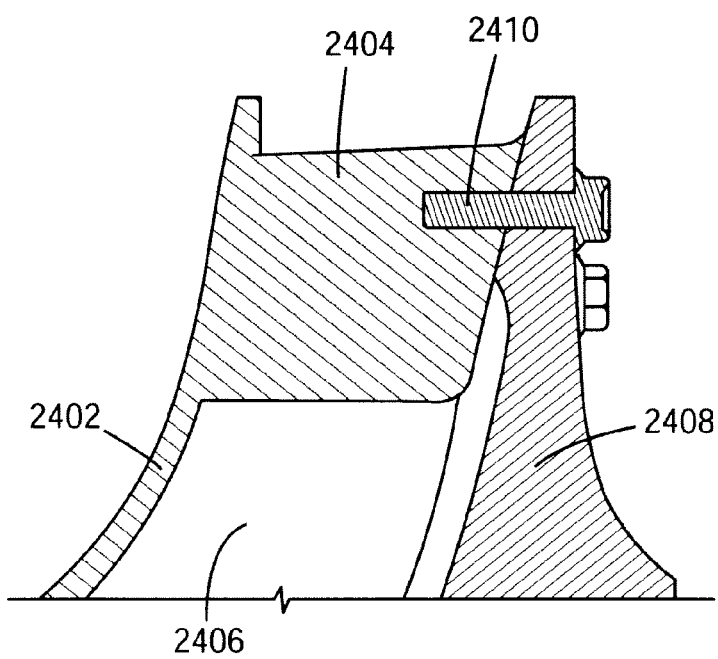

According to another exemplary embodiment illustrated in FIG. 24, the impeller 2400 has a shroud 2402 that is formed integrally with plural composite blades 2404. A composite blade 2404 together with a corresponding metallic blade 2406 formed on a metallic base 2408 form an entire blade. The composite blade 2404 may be attached to the metallic base 2408 by a bolt 2410 as shown in FIG. 25. Bolt 2410 may be either glued to the composite blade 2404, welded, or may have a threaded portion that screws into the composite blade 2404. Alternatively, the bolt may be replaced with a blind bolt, metallic wire, rivets, etc.

Figure 26:
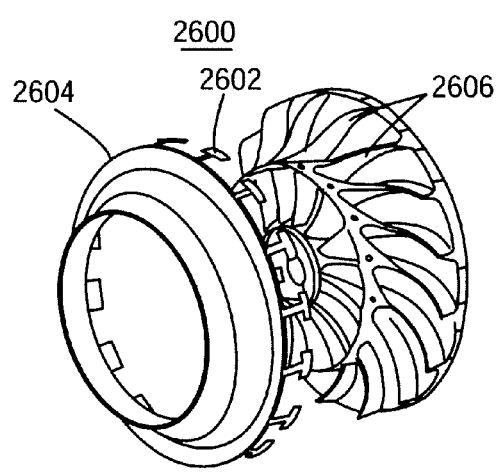
FIGS. 26-29 are schematic views of a composite impeller being made integral with portions of blades according to an exemplary embodiment.
Figure 27:
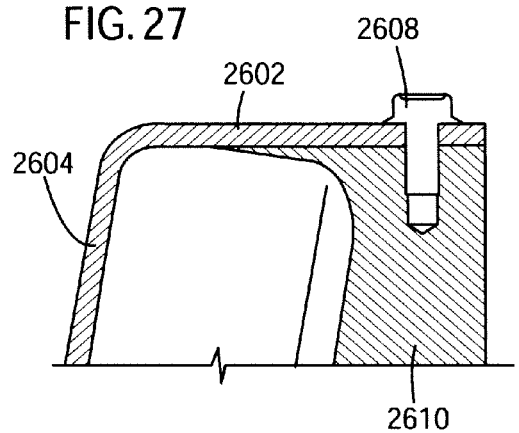
Figure 28:
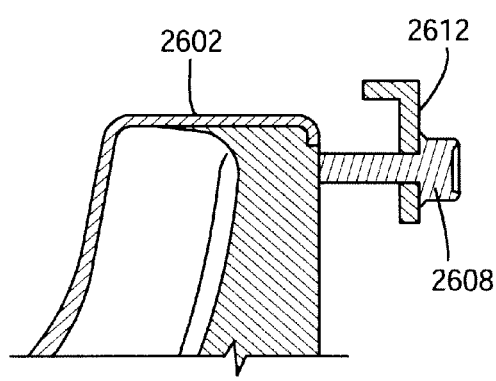
Figure 29:
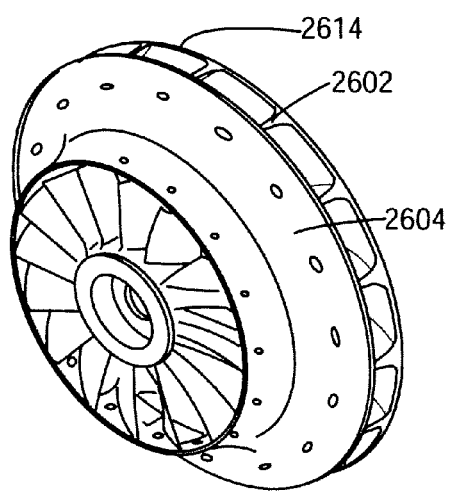

According to still another exemplary embodiment illustrated in FIG. 26, an impeller 2600 may have blade end portions 2602 formed integrally or attached to a shroud 2604. In this embodiment, the blade end portions 2602 are made of a composite material. However, the blade end portions 2602 are not part of the blades 2606. The blade end portions 2602 act as a cap for the blades 2606. FIG. 27 shows the blade end portions 2602 being attached with a bolt or pin 2608 to a side portion of a metallic base 2610. In another application illustrated in FIG. 28, the bolt 2608 may connect a bracket 2612 to a back surface of the metallic base 2610. The bracket 2612 is configured to fix the blade end portions 2602 to the side portion of the metallic base 2610. In still another exemplary embodiment illustrated in FIG. 29, the blade end portions 2602 are connected to each other by connecting portions 2614.

Figure 30:
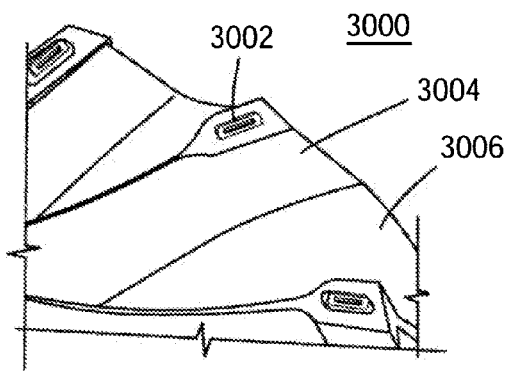
FIGS. 30-34 are schematic views of a composite impeller being attached with a band to blades according to an exemplary embodiment.
Figure 31:
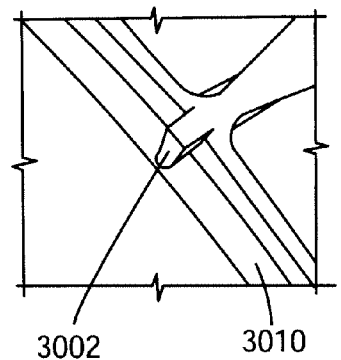
Figure 32:
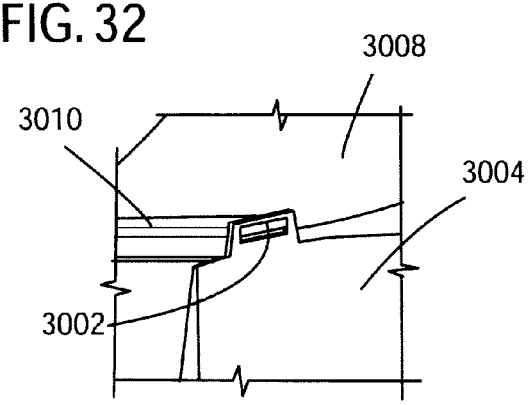
Figure 33:
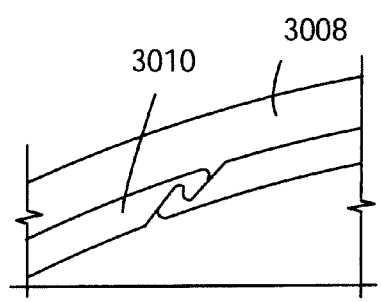

According to another exemplary embodiment illustrated in FIG. 30, an impeller 3000 includes one or more connecting elements 3002 attached or formed on corresponding blades 3004. Blades 3004 are formed or attached to a front surface of a metallic base 3006. The connecting elements 3002 may be closed as shown in FIG. 30 or open as shown in FIG. 31. After a shroud 3008 is placed on blades 3004, the connecting elements 3002 penetrate through corresponding holes formed in the shroud 3008. At this stage, a band 3010 may be inserted through the connecting elements 3002 as shown in FIG. 32, on top of the shroud 3008 to fix the shroud 3008 to the blades. The same is shown in FIG. 31. The band 3010 may be closed as shown in FIG. 33 or by other known means, e.g., glue, welded, bolt, etc.

The embodiments illustrated in FIGS. 30-33 shows the connecting elements 3002 formed at the trailing edge of the blades 3004. However, the connecting elements 3002 may be formed at other locations along the blades. In addition, the connecting elements 3002 may be combined with other connecting means as previously discussed. Also, the blades 3004 may be formed entirely of a metallic material or a combination of metallic and composite materials as shown, for example, in FIG. 15. The same applies to the composition of the connecting elements 3002.

Figure 34:
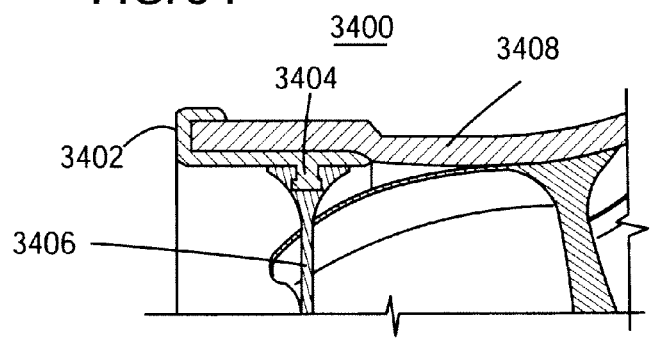

In still another exemplary embodiment illustrated in FIG. 34, an impeller 3400 has brackets 3402 attached with pins 3404 to blades 3406. The brackets are configured to receive a trailing edge of a shroud 3408 to fix the shroud 3408 to the blades 3406. Alternatively, the pin 3404 may be formed integrally with the bracket 3402 and the pin 3404 may be formed to have a dovetail shape to be attached to the blade 3406.

Figure 35:
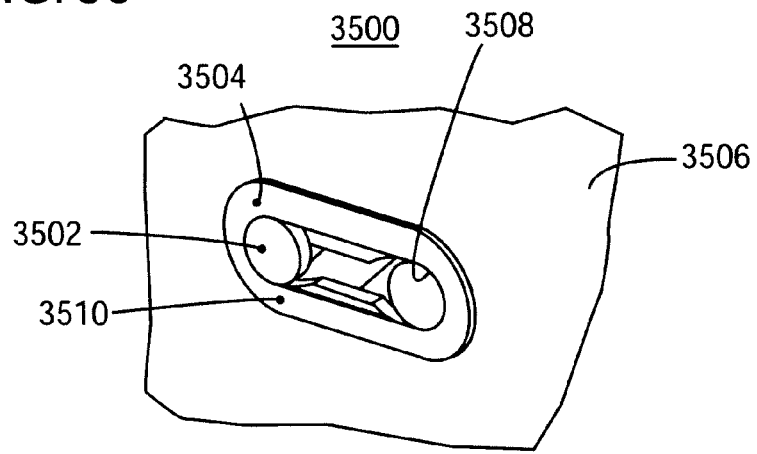
FIGS. 35-37 are schematic views of a composite impeller using a bayonet or pin element to be attached to blades according to an exemplary embodiment.
Figure 36:
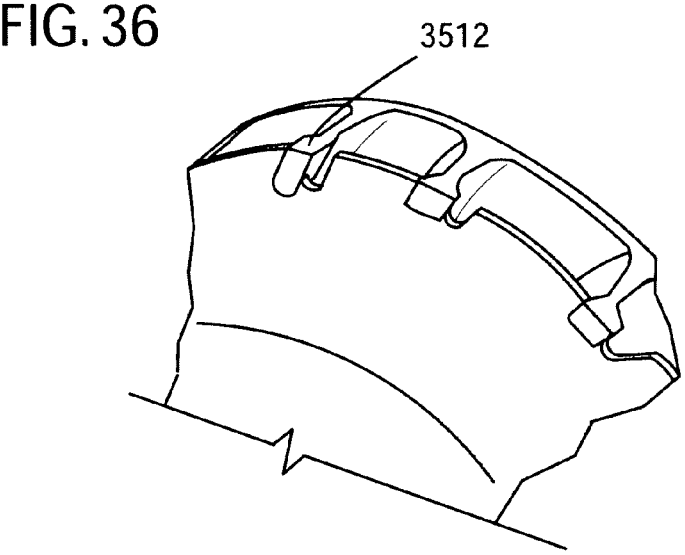
Figure 37:
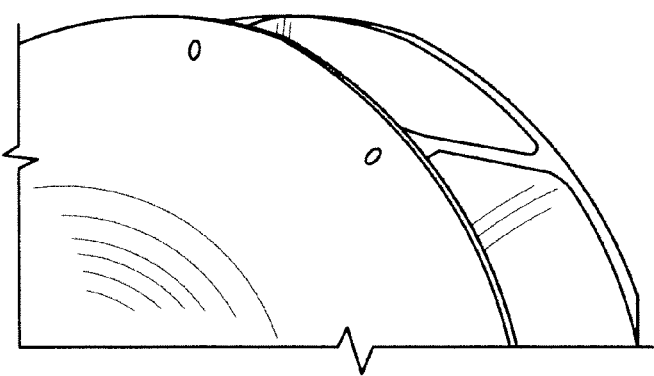

In another exemplary embodiment illustrated in FIG. 35, an impeller 3500 has a pin 3502 formed or attached to the blade (not shown). The pins are formed on a leading edge of the blades. The pin 3502 penetrates through a hole 3504 formed in a shroud 3506. Hole 3504 may have a first region 3508 having a large width in which the pin 3502 enters and a second region 3510 having a smaller width and configured to lock pin 3502. At the trailing edge of the blade, a bayonet mechanism 3512 as shown in FIG. 36 may be used to fix the trailing part of the shroud to the blade. Alternatively, FIG. 37 shows a riveted pin that connects the trailing edge of the blade to the trailing part of the shroud. The trailing edge in FIG. 37 is constrained in all degrees of freedom while the trailing edge of the shroud in FIG. 36 has a degree of freedom in a hoop direction.

Figure 38:
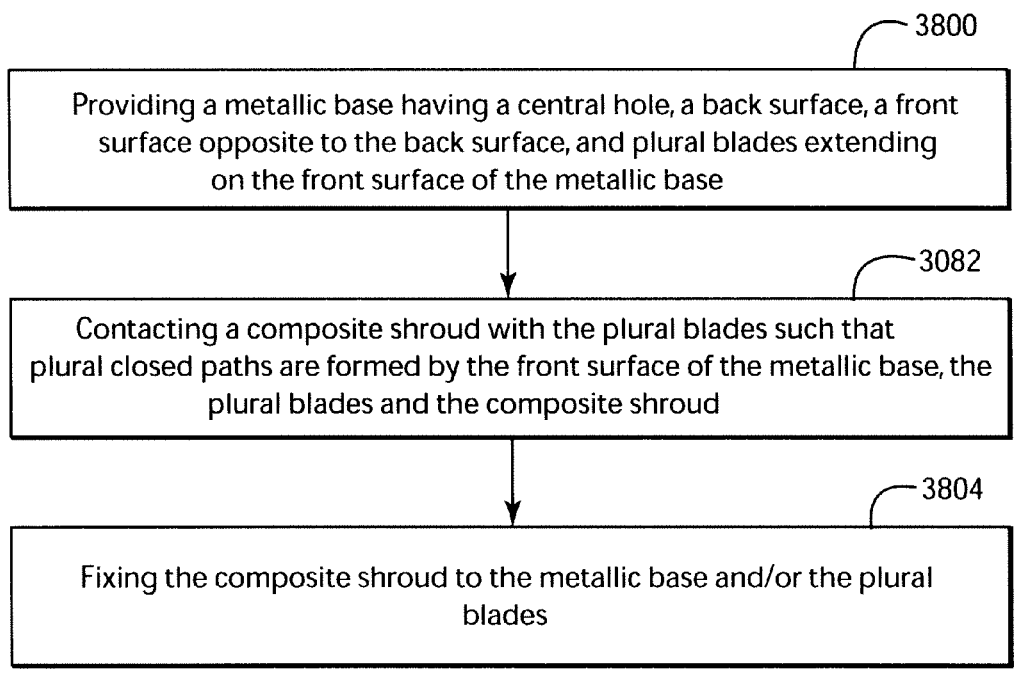
FIG. 38 is a flow chart illustrating a method for attaching a composite shroud to blades and/or a metallic support according to an exemplary embodiment.

According to an exemplary embodiment illustrated in FIG. 38, there is a method for attaching a composite shroud to blades in an impeller for a turbo-machine. The method includes a step 3800 of providing a metallic base having a central hole, a back surface, a front surface opposite to the back surface, and plural metallic blades extending on the front surface of the metallic base; a step 3802 of contacting the composite shroud with the plural metallic blades such that plural closed paths are formed by the front surface of the metallic base, the plural metallic blades and the composite shroud; and a step 3804 of fixing the composite shroud to the metallic base and/or the plural metallic blades. The fixing step may include various steps for implementing every mechanism discussed above with regard to FIGS. 15-37. In addition, the fixing step may include, for example, using an adhesive (or silicon or resin) or a rivet or a combination of these mechanisms and those already discussed for fixing the shroud to the blades and/or metallic base.

The disclosed exemplary embodiments provide a system and a method for attaching a composite shroud to metallic blades and/or a metallic support of an impeller. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

Figure 39:
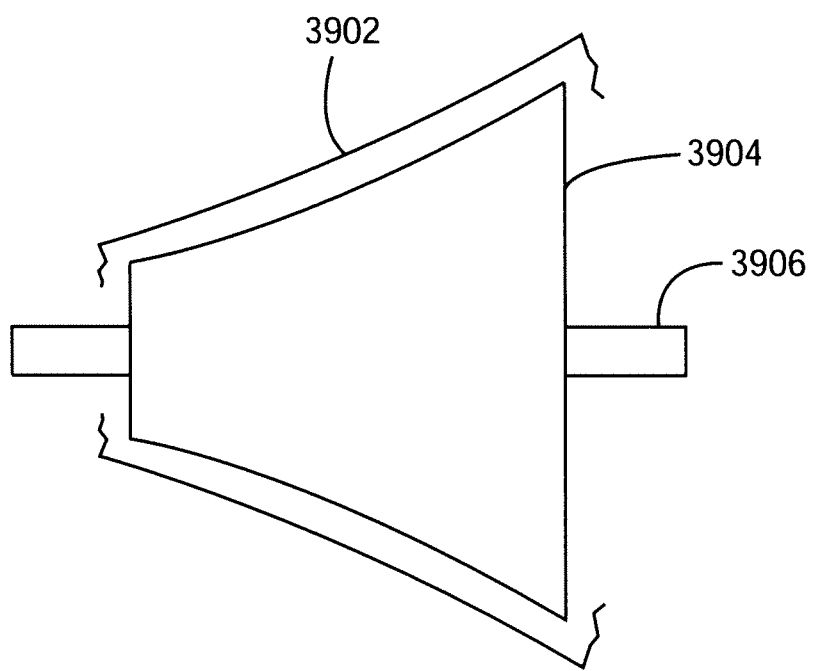
FIG. 39 is a schematic diagram of a centrifugal compressor having an impeller including one or more of the features of the above noted exemplary embodiments.

For example, the embodiments discussed above may be applicable to a turbo machine having a diameter of the centrifugal impeller (for a centrifugal compressor or a turboexpander) from about 150 millimeters to about 2 meters. Such a centrifugal compressor 3900 is shown in FIG. 39 and includes a casing 3902, an impeller 3904 and a rotor 3906 configured to hold the impeller. The impeller may be any of the impeller discussed in the previous exemplary embodiments. A pressure range (from an inlet to an outlet of a single machine including at least one impeller, preferably a plurality of impellers) is about 1 to 1000 bar. The impeller according to one or more of the above discussed embodiments may be also built for lower technical applications, as for example for turbines of car engines or blowers. However, it is noted that such applications do not face the challenges encountered by turbo-machines, in which, because of their size, the size of the centrifugal force is considerable and may have destructive effects on the impellers.

What is claimed is:

1. An impeller for a turbo-machine, the impeller comprising:
   a metallic base having a central hole, a back surface and a front surface opposite to the back surface;
   at least one blade extending on the front surface of the metallic base;
   a composite shroud attached to the at least one blade such that plural closed paths are formed by the front surface of the metallic base, the at least one blade and the composite shroud; and
   a connector configured to attach the composite shroud to the metallic base or the at least one blade.

2. The impeller of claim 1, wherein a leading edge of the at least one blade is made of the composite material and the remaining part is made of the metallic material, or a trailing edge of the at least one blade is made of the composite material and the remaining part is made of the metallic material, or both the leading and trailing edges of the at least one blade is made of the composite material and the remaining part is made of the metallic material.

3. The impeller of claim 2, wherein the connector comprises:
   an adhesive or silicon or resin distributed between those parts made of the composite material.

4. The impeller of claim 1, wherein the composite shroud includes brackets made of the composite material that are configured to fit inner parts of the at least one blade, wherein the connector includes an adhesive or silicon or resin that connects the brackets to the inner parts of the at least one blade, and the brackets and the inner parts of the at least one blade form a smooth profile of the at least one blade.

5. The impeller of claim 1, further comprising:
   composite stripes connected to and extending from the composite shroud to the back surface of the metallic base over a trailing edge of the at least one blade.

6. The impeller of claim 1, wherein the composite shroud includes plural depressions and the connector includes plural pins attached to the at least one blade and configured to fit inside the plural depressions such that the plural pins have an open position and a closed position, the open position allowing the plural pins to enter or exit the depressions while the closed position locks the plural pins inside the plural depressions.

7. The impeller of claim 1, wherein the connector includes plural hooks formed on the at least one blade and corresponding plural holes in the composite shroud that are configured to receive the plural hooks.

8. The impeller of claim 1, wherein the connector includes plural pins formed on the at least one blade and corresponding plural holes in the composite shroud that are configured to receive the plural pins.

9. The impeller of claim 1, wherein the connector includes plural pins provided in plural holes formed in the at least one blade and corresponding holes in the composite shroud.

10. The impeller of claim 9, wherein the plural pins are riveted or threaded to receive nuts or both to fix the composite shroud to the at least one blade.

11. The impeller of claim 1, further comprising:
    plural composite blades integrally formed with the composite shroud and configured to connect to the at least one blade on the front surface of the metallic base so that an entire blade is made of a composite material at a trailing edge and made of a metallic material at a leading edge, wherein the leading edge first encounters a fluid to be processed by the impeller and the trailing edge encounters last the fluid.

12. The impeller of claim 11, wherein the connector includes a blind bolt or a metallic wire or rivets or bolts that are configured to connect the plural composite blades to the metallic base.

13. The impeller of claim 1, further comprising:
    blade end portions integrally formed with the composite shroud and configured to cover a trailing edge of the at least one blade and a portion of a side surface of the metallic base, wherein the side surface of the metallic base is provided between the front surface and the back surface.

14. The impeller of claim 13, wherein the blade end portions form a continuous surface around the side surface of the metallic base.

15. The impeller of claim 13, wherein the connector includes a bolt or a pin that attaches the blade end portions to the side surface of the metallic base.

16. The impeller of claim 13, wherein the connector includes a bolt or a pin that attaches with a bracket the blade end portions to the side surface of the metallic base.

17. The impeller of claim 1, further comprising:
    plural connecting elements formed on the at least one blade such that the each of the plural connecting elements has a hole, wherein the composite shroud has plural holes configured to receive the plural connecting elements, and wherein the connector includes a band that enters the holes of the plural connecting elements to fix the composite shroud to the at least one blade.

18. The impeller of claim 17, wherein the holes of the plural connecting elements are open on one side.

19. The impeller of claim 17, wherein the band is configured to encircle the entire composite shroud.

20. The impeller of claim 1, wherein the connector comprises:
plural brackets configured to be attached to the at least one blade; and
plural pins configured to attach the plural brackets to the at least one blade, wherein the plural pins are configured to fixedly receive the composite shroud.

21. A centrifugal compressor, comprising:
a casing;
a shaft provided in the casing and configured to rotate relative to the casing; and
at least the impeller of claim 1, wherein the impeller is attached to the shaft.

22. A method for attaching a composite shroud to an open or closed metallic impeller for a turbo-machine, wherein the impeller comprises a metallic base having a central hole, a back surface, a front surface opposite to the back surface, and at least one blade extending on the front surface of the metallic base, the method comprising:
contacting the composite shroud with the at least one blade such that plural closed paths are formed by the front surface of the metallic base, the at least one blade and the composite shroud; and
fixing the composite shroud to the metallic base and/or the at least one blade using a connector.

23. The method of claim 22, wherein a leading edge of the at least one blade is made of the composite material and the remaining part is made of the metallic material, or a trailing edge of the at least one blade is made of the composite material and the remaining part is made of the metallic material, or both the leading and trailing edges of the at least one blade is made of the composite material and the remaining part is made of the metallic material.

24. The method of claim 23, further comprising:
applying an adhesive or silicon or resin distributed between those parts made of the composite material.

25. The method of claim 22, further comprising:
bonding brackets of the composite shroud and made of the composite material to inner parts of the at least one blade by using an adhesive or silicon or resin, wherein the brackets and the inner parts of the at least one blade form a smooth profile of the blades.

26. The method of claim 22, further comprising:
connecting composite stripes extending from the composite shroud to the back surface of the metallic base over a trailing edge of the at least one blade; and
curing the composite strips to harden.

27. The method of claim 22, further comprising:
forming plural depressions into the composite shroud; and
attaching plural pins to the at least one blade, wherein the plural pins are configured to fit inside the plural depressions such that the plural pins have an open position and a closed position, the open position allowing the plural pins to enter or exit the depressions while the closed position locks the plural pins inside the plural depressions.

28. The method of claim 22, further comprising:
forming plural hooks on the at least one blade and forming corresponding plural holes in the composite shroud that are configured to receive the plural hooks.

29. The method of claim 22, further comprising:
forming plural pins on the at least one blade and forming corresponding plural holes in the composite shroud that are configured to receive the plural pins.

30. The method of claim 22, further comprising:
forming plural pins in plural holes one the at least one blade and corresponding holes in the composite shroud; and
riveting or threading the plural pins to receive nuts or both to fix the composite shroud to the at least one blade.

31. The method of claim 22, further comprising:
forming plural composite blades integrally with the composite shroud; and
connecting the plural composite blades to the at least one blade on the front surface of the metallic base so that an entire blade is made of a composite material at a trailing edge and made of a metallic material at a leading edge, wherein the leading edge first encounters a fluid to be processed by the impeller and the trailing edge encounters last the fluid.

32. The method of claim 31, further comprising:
connecting with a blind bolt or a metallic wire or rivets or bolts the plural composite blades to the metallic base.

33. The method of claim 22, further comprising:
forming blade end portions integrally with the composite shroud such that the blade end portions are configured to cover a trailing edge of the at least one blade and a portion of a side surface of the metallic base, wherein the side surface of the metallic base is provided between the front surface and the back surface.

34. The method of claim 33, wherein the blade end portions form a continuous surface around the side surface of the metallic base.

35. The method of claim 33, further comprising:
attaching the blade end portions with a bolt or a pin to the side surface of the metallic base.

36. The method of claim 33, further comprising:
attaching a bracket with a bolt or a pin to the metallic base so that blade end portions are fixed by the bracket to the side surface of the metallic base.

37. The method of claim 22, further comprising:
forming plural connecting elements on the at least one blade such that each of the plural connecting elements has a hole;
covering the at least one blade with the composite shroud; and
providing a band through holes of the plural connecting elements to fix the composite shroud to the at least one blade.

38. The method of claim 37, wherein the holes of the plural connecting elements are open on one side.

39. The method of claim 37, wherein the band is configured to encircle an entire periphery of the composite shroud.

40. The method of claim 22, further comprising:
attaching plural brackets to the at least one blade; and
inserting plural pins through the plural brackets and the at least one blade to fix the composite shroud.

41. A centrifugal impeller for turbomachinery, made up of a base centrifugal impeller manufactured with at least one first material and comprising a plurality of blades associated with a rear plate, wherein the centrifugal impeller comprises at least one shroud manufactured with a second material different from the at least one first material and associated with the base impeller; and a connector configured to attach the at least one shroud to the base or the at least one blade.

42. The centrifugal impeller of claim 41, wherein the second material is a metallic mesh.

43. The centrifugal impeller of claim 41, wherein the second material is a resin.

44. The centrifugal impeller of claim 41, wherein the second material is a composite material.

45. The centrifugal impeller of claim 41, wherein the first material is at least in part a metal.

46. The centrifugal impeller of claim 41, wherein the blades and/or the rear plate are made at least in part with the second material or else with a third material different from the first and second material.

47. The centrifugal impeller of claim 41, wherein the shroud is associated on the base centrifugal impeller by at least one layer of glue or resin.

48. The centrifugal impeller of claim 41, wherein the shroud is associated on the base centrifugal impeller by an attachment system.

49. The centrifugal impeller of claim 41, wherein the base centrifugal impeller is of the closed type, comprising a first base shroud made with the first material over which the shroud is at least partially associated.

50. The centrifugal impeller of claim 41, wherein the base centrifugal impeller is of the open type, comprising a plurality of blades with suitable shaped ends over which the shroud is at least partially associated.

51. Turbomachinery comprising at least one centrifugal impeller according to claim 41.

52. A shroud for a centrifugal impeller, manufactured with a second material and suitable for being applied onto a base centrifugal impeller made with at least one first material different from the second material so as to make a centrifugal impeller according to claim 41.

53. A method for making a centrifugal impeller for turbomachinery, the method comprising:
 making a base centrifugal impeller manufactured with at least one first material and comprising at least one plurality of blades associated with a rear plate;
 making at least one shroud manufactured with a second material different from the at least one first material; and
 associating the at least one shroud onto the base centrifugal impeller using a connector.

54. The method of claim 53, further comprising gluing the at least one shroud onto the base centrifugal impeller through a resin or a glue.

55. The method of claim 53, further comprising fixing the at least one shroud onto the base centrifugal impeller through an attachment system.

* * * * *